US012498805B2

(12) United States Patent
Lian et al.

(10) Patent No.: US 12,498,805 B2
(45) Date of Patent: Dec. 16, 2025

(54) INPUT DEVICE

(71) Applicant: Lite-On Technology Corporation, Taipei (TW)

(72) Inventors: Hao Jhih Lian, Taipei (TW); Chien-I Lee, Taipei (TW); Chi Feng Chen, Taipei (TW); Zhi-Yun Zhang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 18/963,529

(22) Filed: Nov. 28, 2024

(65) Prior Publication Data

US 2025/0181179 A1  Jun. 5, 2025

Related U.S. Application Data

(60) Provisional application No. 63/550,049, filed on Feb. 6, 2024, provisional application No. 63/604,904, filed on Dec. 1, 2023.

(30) Foreign Application Priority Data

Aug. 30, 2024  (CN) .......................... 202422126903.6

(51) Int. Cl.
*G06F 3/0362* (2013.01)

(52) U.S. Cl.
CPC ................................. *G06F 3/0362* (2013.01)

(58) Field of Classification Search
CPC ...................................................... G06F 3/0362
See application file for complete search history.

(56) References Cited

U.S. PATENT DOCUMENTS

| 2006/0109246 | A1* | 5/2006 | Lee | ........................ | G01D 5/145 |
| | | | | | 345/163 |
| 2018/0210562 | A1* | 7/2018 | Kao | ...................... | G06F 3/0362 |
| 2022/0300095 | A1* | 9/2022 | Cheng | ................... | G06F 3/0354 |

* cited by examiner

Primary Examiner — Hang Lin
(74) Attorney, Agent, or Firm — JCIPRNET

(57) ABSTRACT

An input device includes a housing having an opening and a scroll wheel structure disposed in the housing. The scroll wheel structure includes a support frame fixed in the housing, a scroll wheel frame, a positioning frame including a first body portion connected to the support frame and a second body portion disposed in the scroll wheel frame, a magnetic member disposed in the scroll wheel frame and including first and second portions, and a magnet. The scroll wheel frame is pivotally connected to the support frame via a pivot disposed at a center of the scroll wheel frame, and a portion of the scroll wheel frame is protruded out of the housing via the opening. The magnet is disposed at the positioning frame or the scroll wheel frame corresponding to the magnetic member and separated from the first and second portions by first and second distances, respectively.

19 Claims, 20 Drawing Sheets

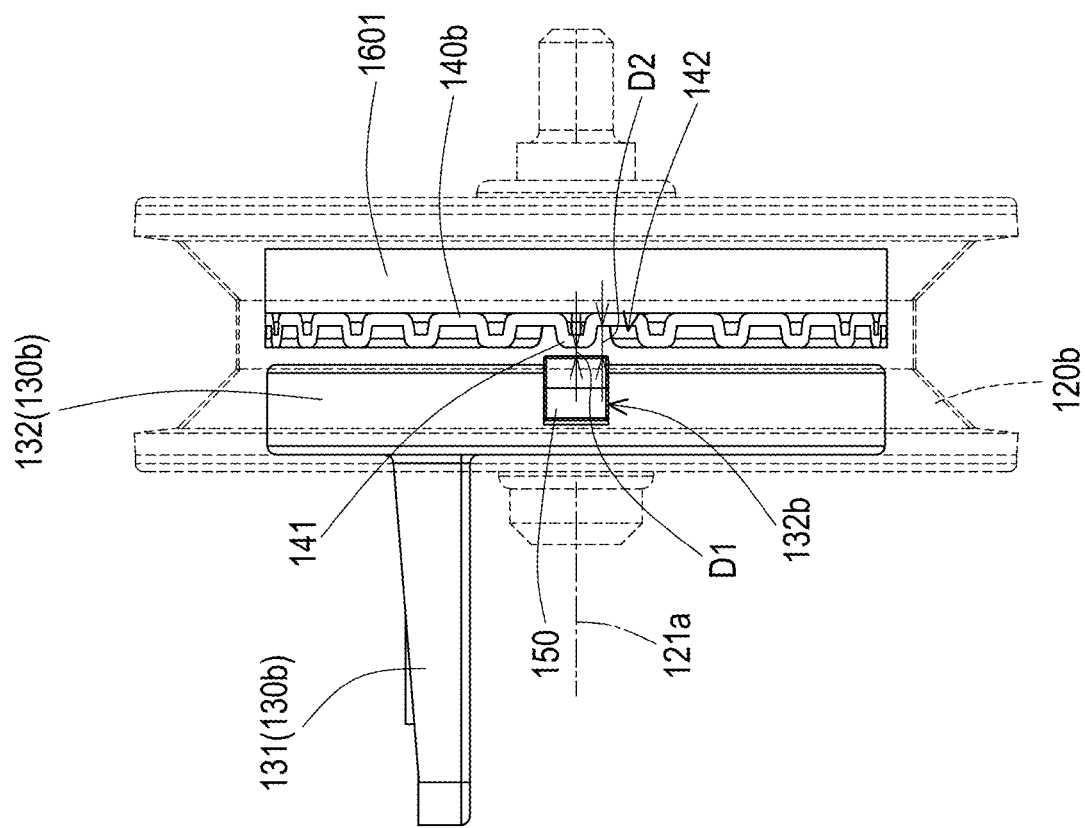

INPUT DEVICE

CROSS-REFERENCE TO RELATED APPLICATION

This application claims the priority benefit of U.S. provisional application Ser. No. 63/604,904, filed on Dec. 1, 2023, U.S. provisional application Ser. No. 63/550,049, filed on Feb. 6, 2024 and China application serial no. 202422126903.6, filed on Aug. 30, 2024. The entirety of each of the above-mentioned patent applications is hereby incorporated by reference herein and made a part of this specification.

BACKGROUND OF THE INVENTION

Field of the Invention

The invention relates to an input device, in particular to an input device including a scroll wheel structure.

Description of Related Art

A mouse is an input device commonly used in personal desktop computers or notebook computers. It is equipped with a scroll wheel for a user to control the scrolling of the screen. In general, there is a mechanical encoder connected to the scroll wheel inside the mouse. When the user rolls the scroll wheel with his finger, the scroll wheel drives the turntable of the mechanical encoder, causing a plurality of contact points of the turntable to contact the contact points of the base in sequence to generate pulse signals and segmented tactile feedback. Over time, the contact points are likely worn out, resulting in poor contact and deterioration of providing segmented tactile feedback.

SUMMARY OF THE INVENTION

The invention provides an input device, such as a mouse or a keyboard, that may produce clear segmented tactile feedback. In addition, the input device of the invention may also be switched between a segmented mode generating greater feedback resistance and a shuttle mode generating less feedback resistance.

An embodiment of the invention provides an input device including a housing and a scroll wheel structure. The housing has an opening. The scroll wheel structure is disposed in the housing and includes a support frame, a scroll wheel frame, a positioning frame, a magnetic member, and at least one magnet. The support frame is fixed in the housing. The scroll wheel frame is pivotally connected to the support frame via a pivot disposed at a center of the scroll wheel frame, so that the scroll wheel frame is adapted to be rotated around an axis of the pivot, and a portion of the scroll wheel frame is protruded out of the housing via the opening. The positioning frame includes a first body portion and a second body portion, wherein the first body portion is connected to the support frame, and the second body portion is disposed in the scroll wheel frame. The magnetic member is disposed in the scroll wheel frame, wherein the magnetic member includes a first portion and a second portion, and the first portion and the second portion are alternately disposed around the axis. The magnet is disposed at the positioning frame or the scroll wheel frame corresponding to the magnetic member. The magnet is separated from the first portion by a first distance and separated from the second portion by a second distance.

According to an embodiment of the invention, the first body portion has an extension portion extended along a direction of the axis, and the extension portion is connected to the support frame.

According to an embodiment of the invention, at least one positioning groove is disposed in a radial direction of the second body portion, and the magnet is fixed in the positioning groove.

According to an embodiment of the invention, at least one positioning groove is disposed on an inner side of the scroll wheel frame in a radial direction, and the magnet is fixed in the positioning groove.

In an embodiment of the invention, a quantity of both the first portion and the second portion are plurality, a plurality of positioning protrusions surrounding the axis are disposed at an inner side of the scroll wheel frame, and each of the positioning protrusions is engaged between two adjacent first portions or engaged in one of the second portions.

In an embodiment of the invention, the magnetic member is disposed in an outer peripheral direction of the second body portion.

In an embodiment of the invention, the magnetic member is a magnetic ring, and the first portion and the second portion are arranged at one or both of an outer peripheral surface and an inner peripheral surface of the magnetic ring. The first portion is a protrusion protruded along a radial direction of the second body portion, and the second portion is a groove recessed along the radial direction of the second body portion.

In an embodiment of the invention, the magnetic member is disposed in an axial direction of the positioning frame, the magnetic member is a magnetic ring or a magnetic plate, and the first portion and the second portion are respectively a protrusion protruded along a direction of the axis and a groove recessed along the direction of the axis.

In an embodiment of the invention, the magnet is aligned with at least one of the first portion and the second portion in a radial direction or an axial direction.

In an embodiment of the invention, a weight member is disposed in an axial direction or a radial direction of the positioning frame.

In an embodiment of the invention, the scroll wheel frame includes a first scroll wheel plate and a second scroll wheel plate that are parallel to each other in a direction of the axis, the magnetic member is clamped and fixed between the first scroll wheel plate and the second scroll wheel plate, and the magnet passes through the first scroll wheel plate and is extended into the magnetic member.

In an embodiment of the invention, the magnetic member includes a first fixing portion, and the scroll wheel frame includes a second fixing portion. The first fixing portion is engaged with the second fixing portion.

Another embodiment of the invention provides an input device including a housing and a scroll wheel structure. The housing has an opening. The scroll wheel structure is disposed in the housing and includes a support frame, a scroll wheel frame, a positioning frame, a magnetic member, and at least one magnet. The support frame is fixed in the housing. The scroll wheel frame is pivotally connected to the support frame via a pivot disposed at a center of the scroll wheel frame, so that the scroll wheel frame is adapted to be rotated around an axis of the pivot, and a portion of the scroll wheel frame is protruded out of the housing via the opening. The positioning frame includes a first body portion and a second body portion, wherein the first body portion is connected to the support frame, and the second body portion is opposite to the scroll wheel frame. The magnetic member is disposed at the scroll wheel frame, wherein the magnetic member includes a first portion and a second portion, and the first portion and the second portion are alternately disposed around the axis. The magnet is disposed at the positioning frame or the scroll wheel frame corresponding to the magnetic member. The magnet is separated from the first portion by a first distance and separated from the second portion by a second distance.

In another embodiment of the invention, the magnetic member is a magnetic washer, wherein the first portion is a first magnetic pole, and the second portion is a second magnetic pole different from the first magnetic pole or a non-magnetic pole.

In another embodiment of the invention, the magnet has a first magnetic pole and a second magnetic pole different from the first magnetic pole or a non-magnetic pole, and the first magnetic pole and the second magnetic pole or the non-magnetic pole are alternately disposed around the axis.

In another embodiment of the invention, the magnetic member is a magnetic ring, and the first portion is a plurality of magnetic protrusions arranged along an outer peripheral surface of the magnetic ring.

In another embodiment of the invention, the first body portion is rotatably connected to a side of the support frame, wherein the magnet is disposed at the second body portion, and the second body portion may be moved in an axial direction relative to the scroll wheel frame.

In another embodiment of the invention, the input device further includes a motor and a limiting cam coupled to the motor, and the positioning frame further includes a limiting portion. The second body portion and the limiting portion are located at two opposite sides of the first body portion, and the magnet is disposed at a side in the second body portion facing the magnetic member. The limiting cam has an inclined surface, wherein the limiting portion is in sliding contact with the inclined surface.

In another embodiment of the invention, the input device further includes a sensing magnet and a magnetic sensor. The sensing magnet is disposed at the scroll wheel frame. The magnetic sensor is disposed on the support frame, configured to detect information about the sensing magnet, and electrically coupled to the motor.

Based on the above, the input device of the invention integrates a non-contact tactile feedback design into the scroll wheel structure to produce clear segmented tactile feedback when the finger of the user rolls the scroll wheel frame. In addition, based on this non-contact tactile feedback design, the deterioration of segmented tactile feedback caused by wear and tear of components may be prevented. Moreover, by moving the positioning frame to change the relative positions or distance between the magnet and the magnetic member, switching between the segmented mode generating greater feedback resistance and the shuttle mode generating less feedback resistance may be performed.

In order to make the features and advantages of the invention more comprehensible, the following embodiments are described in detail with reference to the accompanying drawings.

BRIEF DESCRIPTION OF THE DRAWINGS

FIG. 3B and FIG. 3C are schematic views of the scroll wheel structure of the third embodiment of the invention from two different viewing angles.

DESCRIPTION OF THE EMBODIMENTS

Figure 1A:
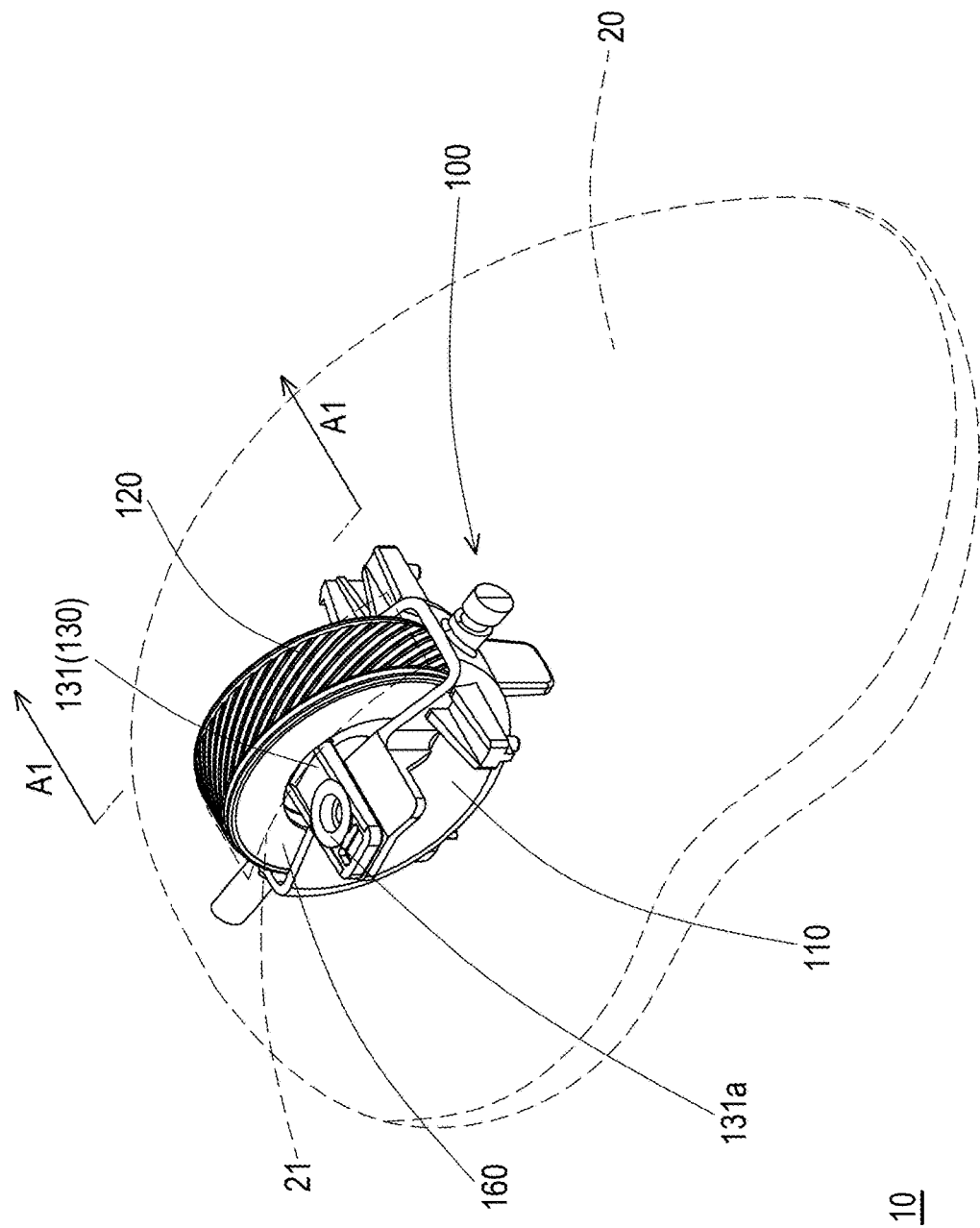
FIG. 1A is a schematic view of the input device of the first embodiment of the invention.
Figure 1B:
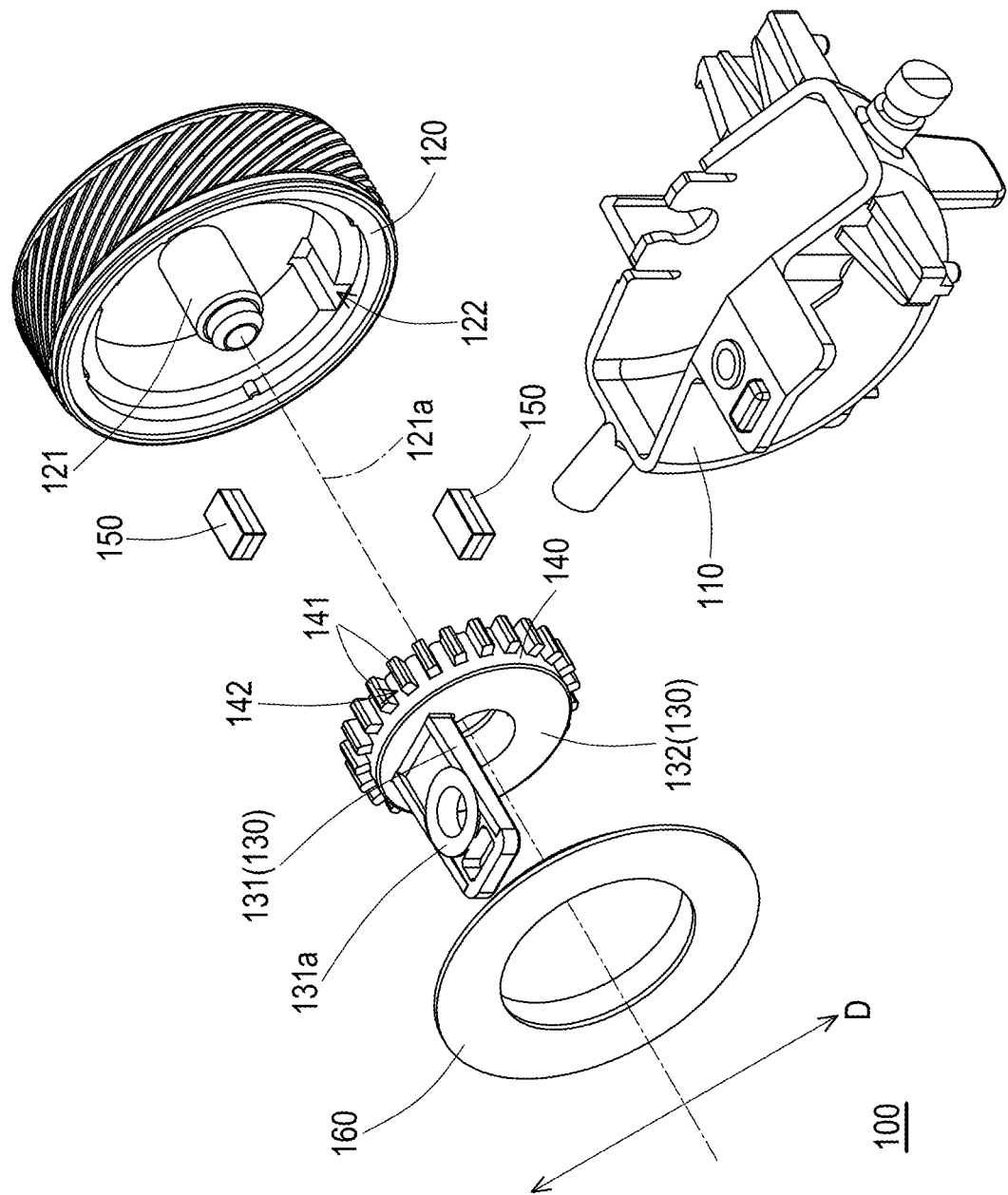
FIG. 1B is an exploded schematic view of the scroll wheel structure of FIG. 1A.
Figure 1C:
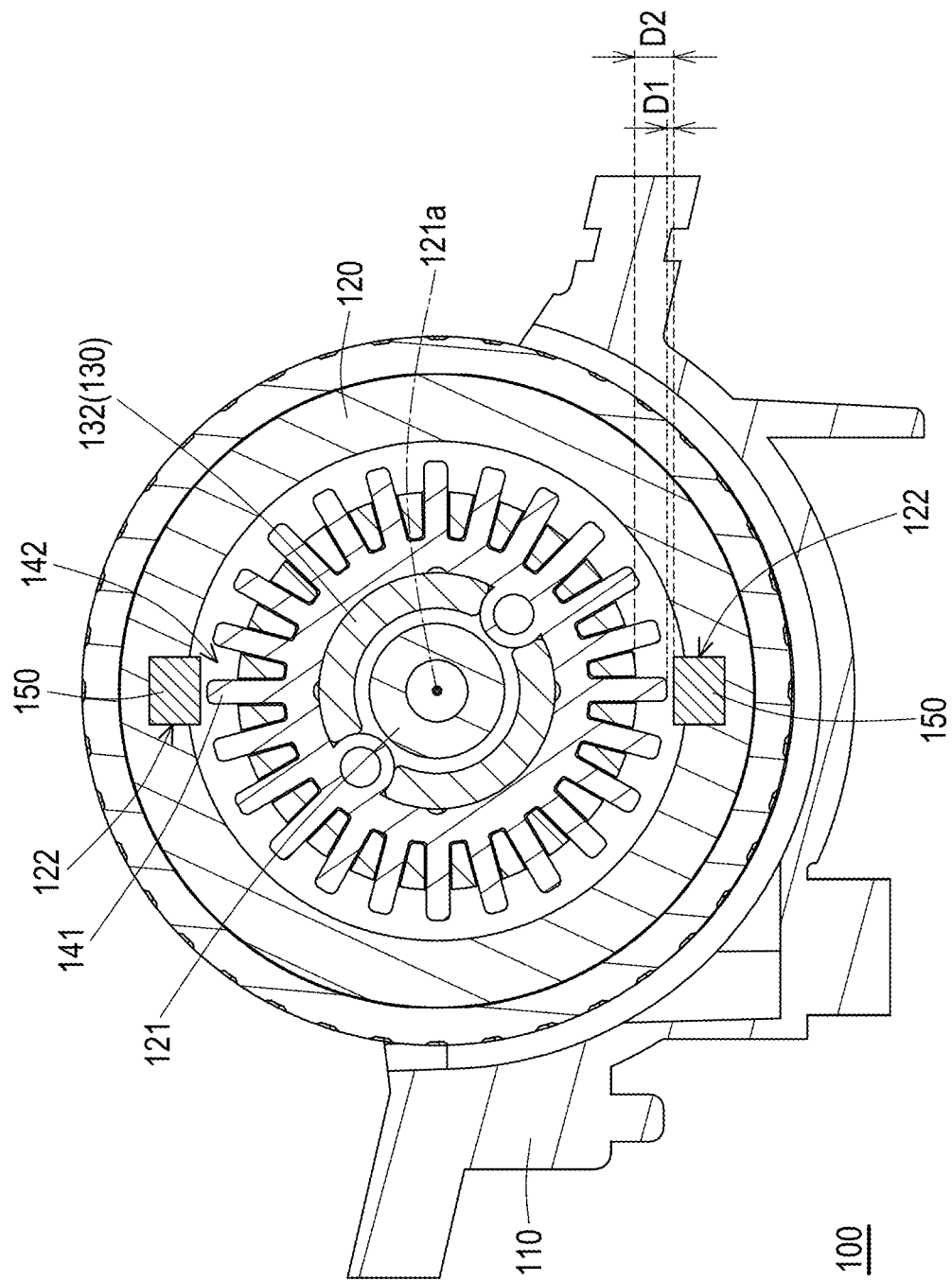
FIG. 1C is a schematic cross-sectional view of the scroll wheel structure of FIG. 1A along line A1-A1.

FIG. 1A is a schematic view of the input device of the first embodiment of the invention. FIG. 1B is an exploded schematic view of the scroll wheel structure of FIG. 1A. FIG. 1C is a schematic cross-sectional view of the scroll wheel structure of FIG. 1A along line A1-A1. Please refer to FIG. 1A. In the present embodiment, an input device 10 may be a mouse and includes a housing 20 and a scroll wheel structure 100. The housing 20 has an opening 21, wherein the scroll wheel structure 100 is disposed in the housing 20, and at least a portion of the scroll wheel structure 100 is protruded out of the housing 20 through the opening 21 to facilitate the finger of the user to roll the scroll wheel structure 100. In other embodiments, the input device 10 may be a portion of a keyboard.

Please refer to FIG. 1A to FIG. 1C. In the present embodiment, the scroll wheel structure 100 includes a support frame 110, a scroll wheel frame 120, a positioning frame 130, a magnetic member 140, and two magnets 150 disposed opposite to each other. The support frame 110 is fixed in the housing 20 corresponding to the opening 21, so that a portion of the scroll wheel frame 120 is accommodating in the support frame 110, and another portion of the scroll wheel frame 120 is protruded out of the housing 20 through the opening 21 for the finger of the user to roll the scroll wheel frame 120. Moreover, the scroll wheel frame 120 is provided with a pivot 121 at its center so it can be pivotally connected to the support frame 110 via the pivot 121; therefore, the scroll wheel frame 120 is adapted to be rotated around an axis 121a of the pivot 121.

The positioning frame 130 includes a first body portion 131 and a second body portion 132, wherein the first body portion 131 is protruded from one side of the second body portion 132 and connected to the support frame 110, for example, fixed to the support frame 110. The first body portion 131 has an extension portion 131a extended along the direction of the axis 121a, and the extension portion 131a is connected to the support frame 110. When the second body portion 132 is disposed in the scroll wheel frame 120, the extension portion 131a of the first body portion 131 protrudes out from the scroll wheel frame 120 along the direction of the axis 121a.

Please refer to FIG. 1B and FIG. 1C. In the present embodiment, the magnetic member 140 is disposed at the peripheral direction of the second body portion 132 or the magnetic member 140 surrounds the second body portion 132, so as to be disposed in the scroll wheel frame 120 together with the second body portion 132. Specifically, the magnetic member 140 may be a magnetic ring made of silicon steel or other magnetic materials sleeved and fixed on the second body portion 132 or integrally formed on the second body portion 132. The magnetic member 140 includes at least one first portion 141 and at least one second portion 142. Taking a plurality of first portions 141 and a plurality of second portions 142 as an example, the plurality of first portions 141 and the plurality of second portions 142 are alternately arranged along the outer peripheral surface of the magnetic ring (i.e., the magnetic member 140) or the second body portion 132 in a direction surrounding the axis 121a. That is, one second portion 142 is provided between two adjacent first portions 141, and one first portion 141 is provided between two adjacent second portions 142.

Moreover, the second body portion 132 may be a hollow cylinder, so that the pivot 121 may pass through the second body portion 132 and be further pivoted to the support frame 110. Specifically, each of the first portions 141 may be a protrusion protruded along a radial direction D (a direction perpendicular to the axis 121a) of the second body portion 132, and each of the second portions 142 may be a groove recessed along the radial direction D of the second body portion 132. It should be noted that FIG. 1B only schematically illustrates one of the radial directions D that are arranged radially.

Please refer to FIG. 1B and FIG. 1C. In the present embodiment, two magnets 150 are disposed at the scroll wheel frame 120 corresponding to the magnetic member 140. For example, the magnets 150 are fixed on the inner side of the scroll wheel frame 120. In addition, the two magnets 150 are arranged in a way that a virtual line connecting them is perpendicular to the axis 121a. Specifically, two positioning grooves 122 are disposed on the inner side of the scroll wheel frame 120 in the radial direction D. Each of the two magnets 150 is fixed in the respective positioning groove 122.

Referring to FIG. 1A to FIG. 1C, when the finger of the user rolls the scroll wheel frame 120, the magnetic member 140 remains stationary as it is fixed to the support frame 110 via the positioning frame 130, while the magnets 150 are rotated synchronously with the scroll wheel frame 120 relative to the magnetic member 140 to be alternately aligned with the first portions 141 and the second portions 142 in the radial direction D of the scroll wheel frame 120. The magnets 150 are separated from the aligned first portions 141 by a first distance D1 and generate a first magnetic force (such as magnetic attraction or magnetic repulsion), and the magnets 150 are separated from the aligned second portions 142 by a second distance D2 greater than the first distance D1 and generate a second magnetic force less than the first magnetic force. That is, when the user rolls the scroll wheel frame 120 by the finger, the magnetic force between each of the magnets 150 and the magnetic member 140 is changed alternately from large to small or from small to large, so as to produce clear segmented tactile feedback.

As shown in FIG. 1A and FIG. 1B, a weight member 160 (i.e., a weight ring) may be further disposed in the radial direction D of the positioning frame 130. The weight member 160 is arranged to surround the axis 121a and disposed on the positioning frame 130. For example, the weight member 160 may be made of stainless steel to increase the weight of the scroll wheel frame 120. Accordingly, when the scroll wheel frame 120 is rotated at high speed, even if the user stops rolling the scroll wheel frame 120, the scroll wheel frame 120 is capable of maintaining rotational inertia to overcome the effects of magnetism and continuing rotation for a period of time.

The design principles of scroll wheel structures 100A to 100G of the following embodiments are substantially the same as the design principles of the scroll wheel structure 100 of the first embodiment. Similar elements are represented by the same reference numerals and repeated descriptions will be omitted.

Figure 2A:
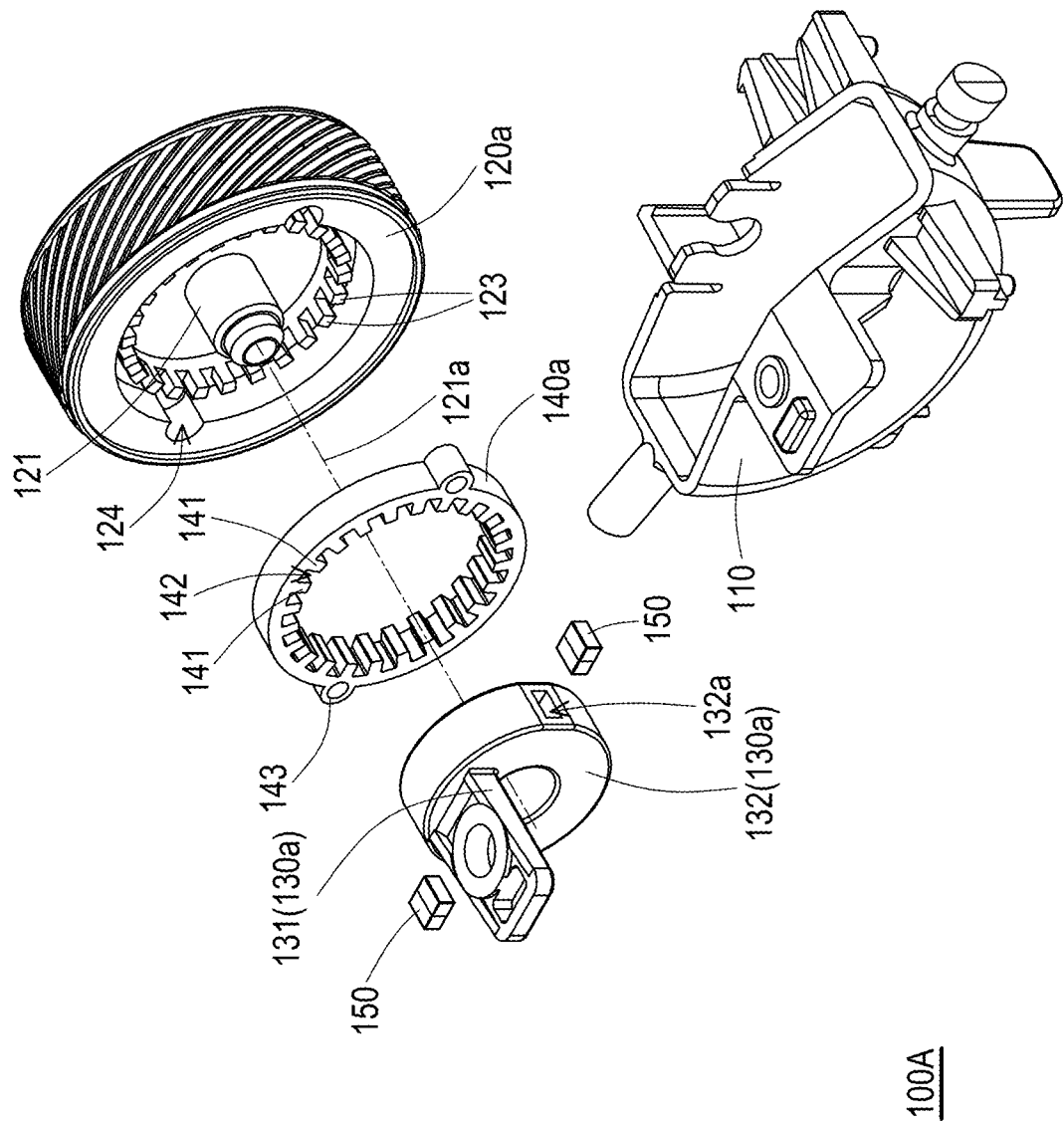
FIG. 2A is an exploded schematic view of the scroll wheel structure of the second embodiment of the invention.
Figure 2B:
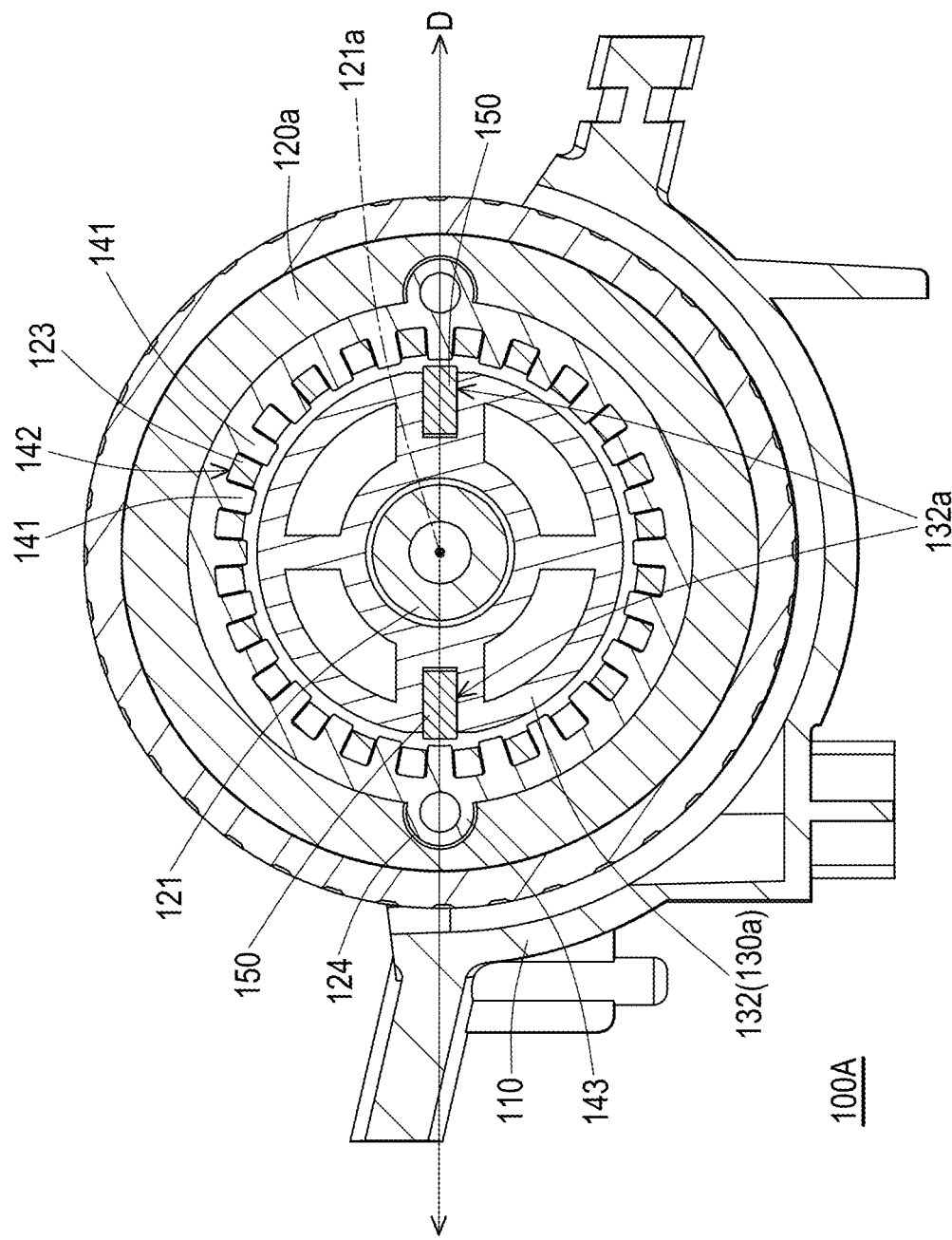
FIG. 2B is a schematic cross-sectional view of the scroll wheel structure of the second embodiment of the invention.

FIG. 2A is an exploded schematic diagram of the scroll wheel structure of the second embodiment of the invention. FIG. 2B is a schematic cross-sectional view of the scroll wheel structure of the second embodiment of the invention. Please refer to FIG. 2A and FIG. 2B. The main differences between the scroll wheel structure 100A of the present embodiment and the first embodiment are the arrangement and the structural configuration of the magnetic members and the magnets.

In the present embodiment, the magnetic member 140a is fixed in the scroll wheel frame 120a and surrounds the second body portion 132 of the positioning frame 130a. Specifically, the plurality of first portions 141 and the plurality of second portions 142 of the magnetic member 140a are alternately arranged on the inner peripheral surface of the magnetic ring (i.e., the magnetic member 140a) in a direction surrounding the axis 121a. Each of the first portions 141 may be a protrusion protruded along the radial direction D of the second body portion 132, and each of the second portions 142 may be a groove recessed along the direction of the radial direction D of the second body portion 132. Moreover, a plurality of positioning protrusions 123 surrounding the axis 121a are disposed on the inner side of the scroll wheel frame 120a, and each of the positioning protrusions 123 is engaged between two adjacent first portions 141 or engaged in one second portion 142 so that the magnetic member 140a is fixed to the scroll wheel frame 120a.

The two magnets 150 are disposed at the positioning frame 130a corresponding to the magnetic member 140a. For example, the magnets 150 are fixed to the outer side of the second body portion 132 in the radial direction D. The two magnets 150 are arranged in a way that a virtual line connecting them is perpendicular to the axis 121a. Specifically, two positioning grooves 132a are disposed at the outer side of the second body portion 132 in the radial direction D. Each of the two magnets 150 is fixed in the respective positioning groove 132a.

In the present embodiment, when the finger of the user rolls the scroll wheel frame 120a, each of the magnets 150 remains stationary as it is fixed to the support frame 110 via the positioning frame 130a, while the magnetic member 140a is rotated synchronously with the scroll wheel frame 120a relative to the magnets 150, so that the magnets 150 are alternately aligned with the first portions 141 and the second portions 142 in the radial direction D of the scroll wheel frame 120a. The interaction between the magnets 150 and the magnetic member 140a is similar to the previous embodiment so further description is omitted.

As shown in FIG. 2A and FIG. 2B, in the present embodiment, the magnetic member 140a includes a first fixing portion 143, and the scroll wheel frame 120a includes a second fixing portion 124. For example, the first fixing portion 143 and the second fixing portion 124 may be a fixing pillar and a fixing slot portion matchable with each other so that the magnetic member 140a can be fixed to the scroll wheel frame 120a via the engagement of the first fixing portion 143 and the second fixing portion 124.

Figure 3A:
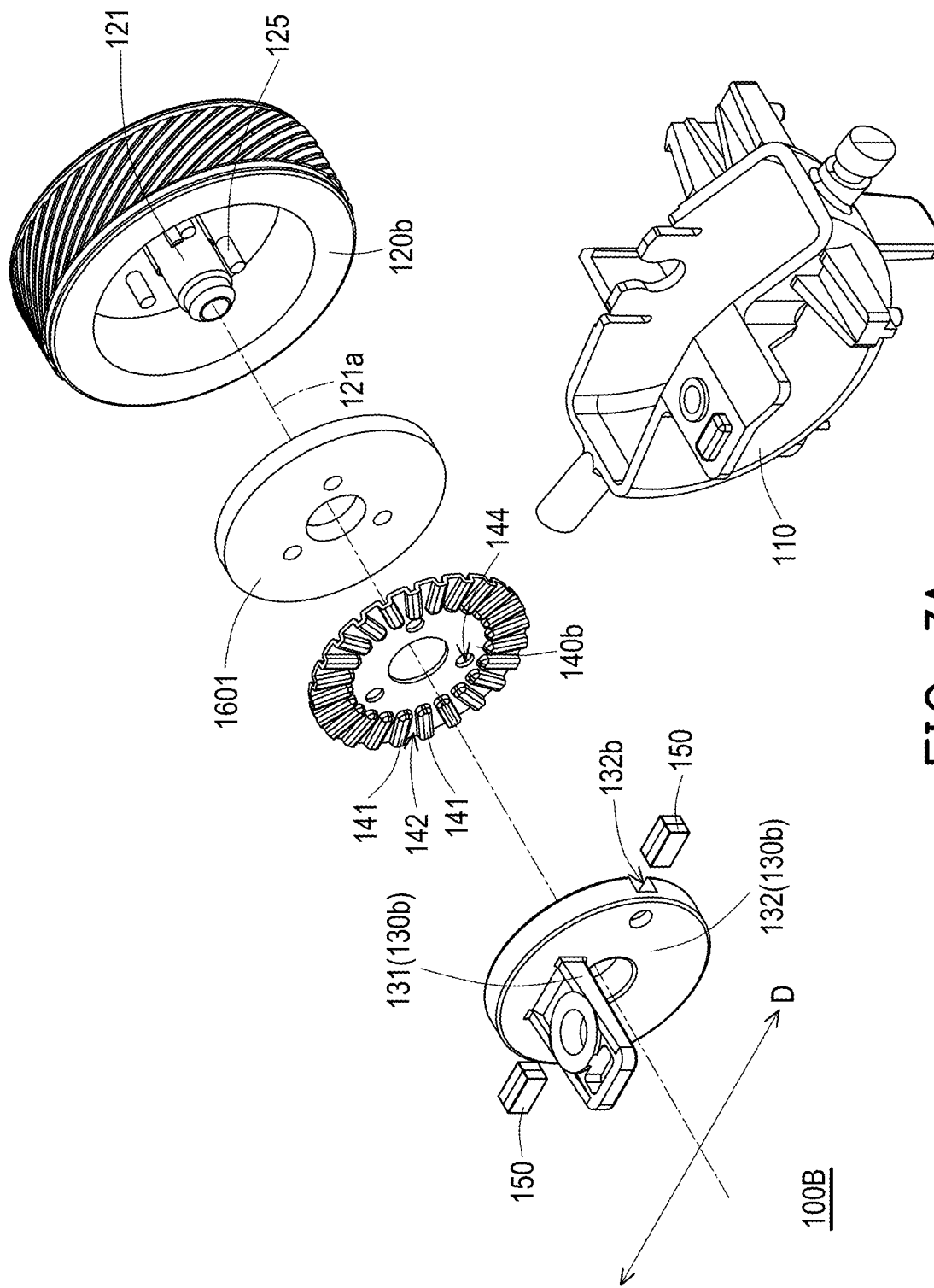
FIG. 3A is an exploded schematic view of the scroll wheel structure of the third embodiment of the invention.
Figure 3B:
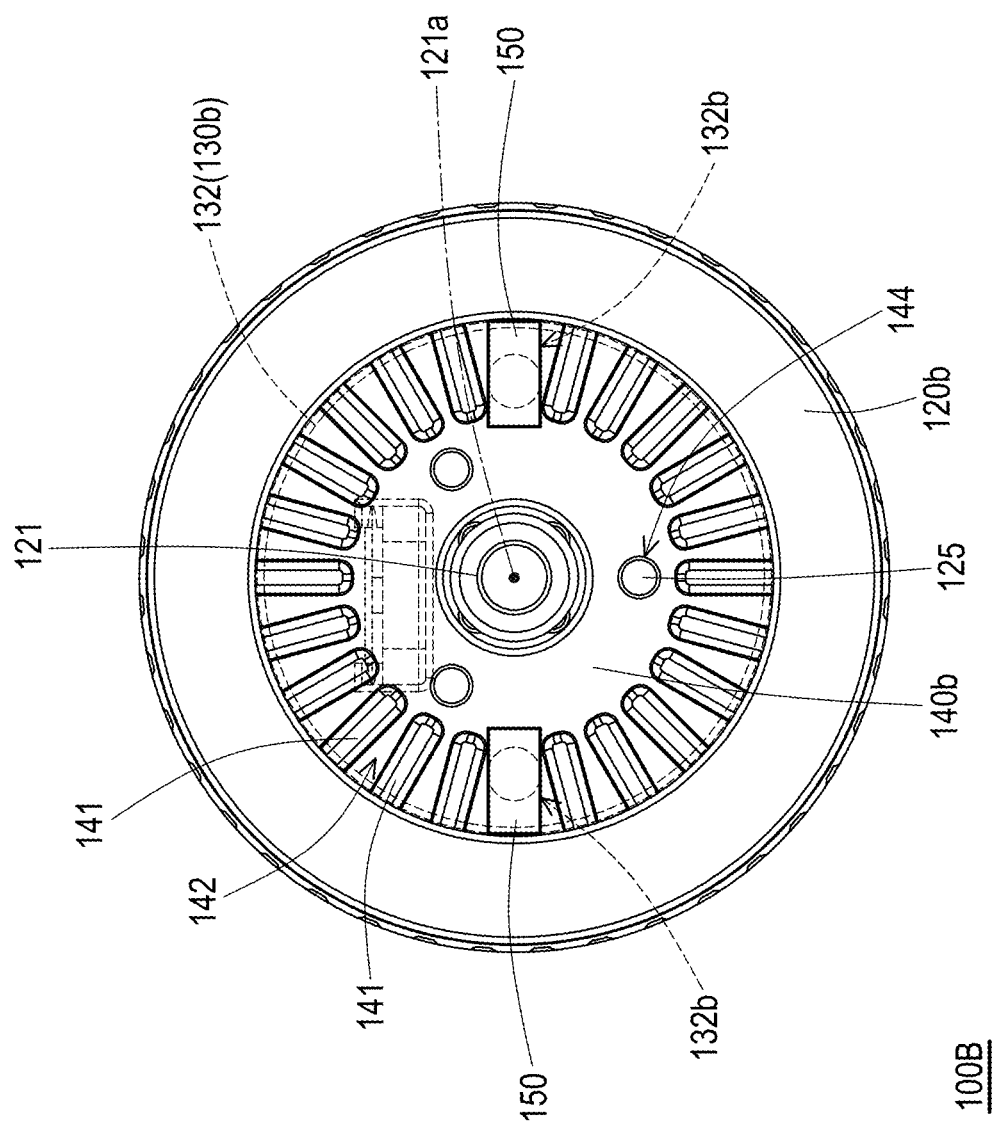

FIG. 3A is an exploded schematic view of the scroll wheel structure of the third embodiment of the invention. FIG. 3B and FIG. 3C are schematic views of the scroll wheel structure of the third embodiment of the invention from two different viewing angles. The positioning frame 130b of FIG. 3B is shown with dotted lines to clearly show the internal structural configuration. The scroll wheel frame 120b of FIG. 3C is shown with a dotted line, and the rubber collar on the scroll wheel frame 120b is omitted to clearly show the internal structural configuration. Please refer to FIG. 3A and FIG. 3C. The main differences between the scroll wheel structure 100B of the present embodiment and the first embodiment are the arrangement and the structural configuration of the magnetic members and the magnets.

In the present embodiment, the magnetic member 140b is fixed in the scroll wheel frame 120b and disposed at one side of the positioning frame 130b in the axial direction (along the direction of the axis 121a). The first portions 141 and the second portions 142 of the magnetic member 140b are respectively protrusions protruded along the axial direction and grooves recessed along the axial direction. The plurality of first portions 141 and the plurality of second portions 142 are alternately arranged around the axis 121a on the side surface of the magnetic ring (i.e., the magnetic member 140b) facing the positioning frame 130b.

Moreover, the two magnets 150 are disposed at the positioning frame 130b corresponding to the magnetic member 140b. For example, the magnets 150 are fixed to the outer side of the second body portion 132, and arranged in a way that a virtual line connecting the two magnets 150 is perpendicular to the axis 121a. Specifically, two positioning grooves 132b recessed from the side surface of the second body portion 132 facing the magnetic member 140b are disposed on the outer side of the second body portion 132 in the radial direction D. Each of the two magnets 150 is fixed in the respective positioning groove 132b.

In the present embodiment, when the finger of the user rolls the scroll wheel frame 120b, each of the magnets 150 remains stationary, while the magnetic member 140b is rotated synchronously with the scroll wheel frame 120b relative to each of the magnets 150, so that the magnets 150 are alternately aligned with the first portions 141 and the second portions 142 in the axial direction of the scroll wheel frame 120b. In the axial direction of the scroll wheel frame 120b, the magnets 150 are separated from the aligned first portions 141 by the first distance D1 and generate a first magnetic force, and the magnets 150 are separated from the aligned second portions 142 by the second distance D2 greater than the first distance D1 and generate a second magnetic force less than the first magnetic force. The interaction between the magnets 150 and the magnetic member 140b is similar to the previous embodiment so the description is omitted.

As shown in FIG. 3A and FIG. 3B, in the present embodiment, the magnetic member 140b includes a first fixing portion 144, and the scroll wheel frame 120b includes a second fixing portion 125. For example, the first fixing portion 144 and the second fixing portion 125 may be a fixing hole and a fixing post matchable with each other, so that the magnetic member 140b can be fixed to the scroll wheel frame 120b via the engagement of the first fixing portion 144 and the second fixing portion 125.

As shown in FIG. 3A and FIG. 3C, a weight member 1601 may be further disposed in the axial direction of the positioning frame 130b. In the present embodiment, the weight member 1601 may be a weight plate fixed to the scroll wheel frame 120b, and the magnetic member 140b is located between the positioning frame 130b and the weight member 1601.

Figure 4A:
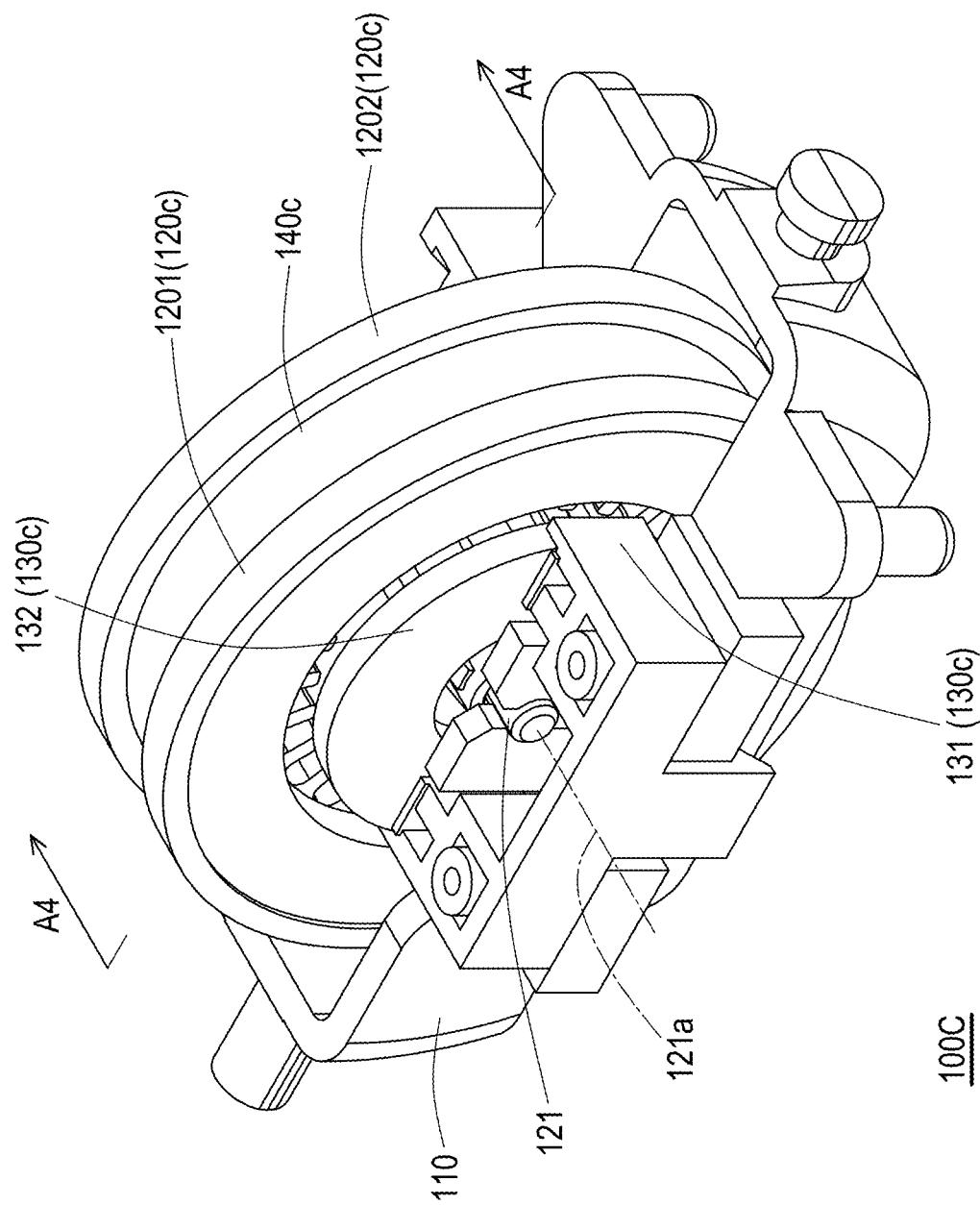
FIG. 4A is a schematic view of the scroll wheel structure of the fourth embodiment of the invention.
Figure 4B:
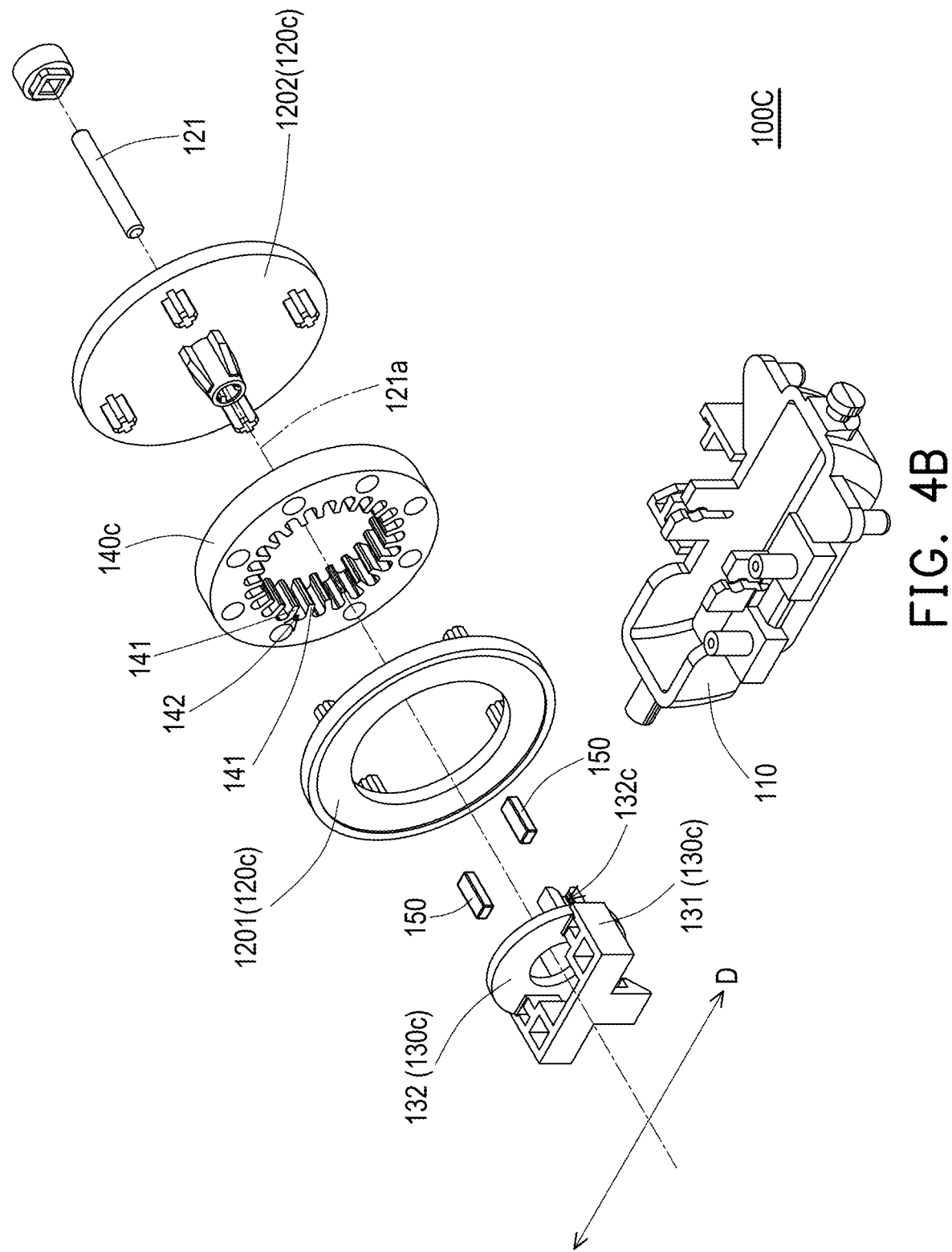
FIG. 4B is an exploded schematic view of the scroll wheel structure of FIG. 4A.
Figure 4C:
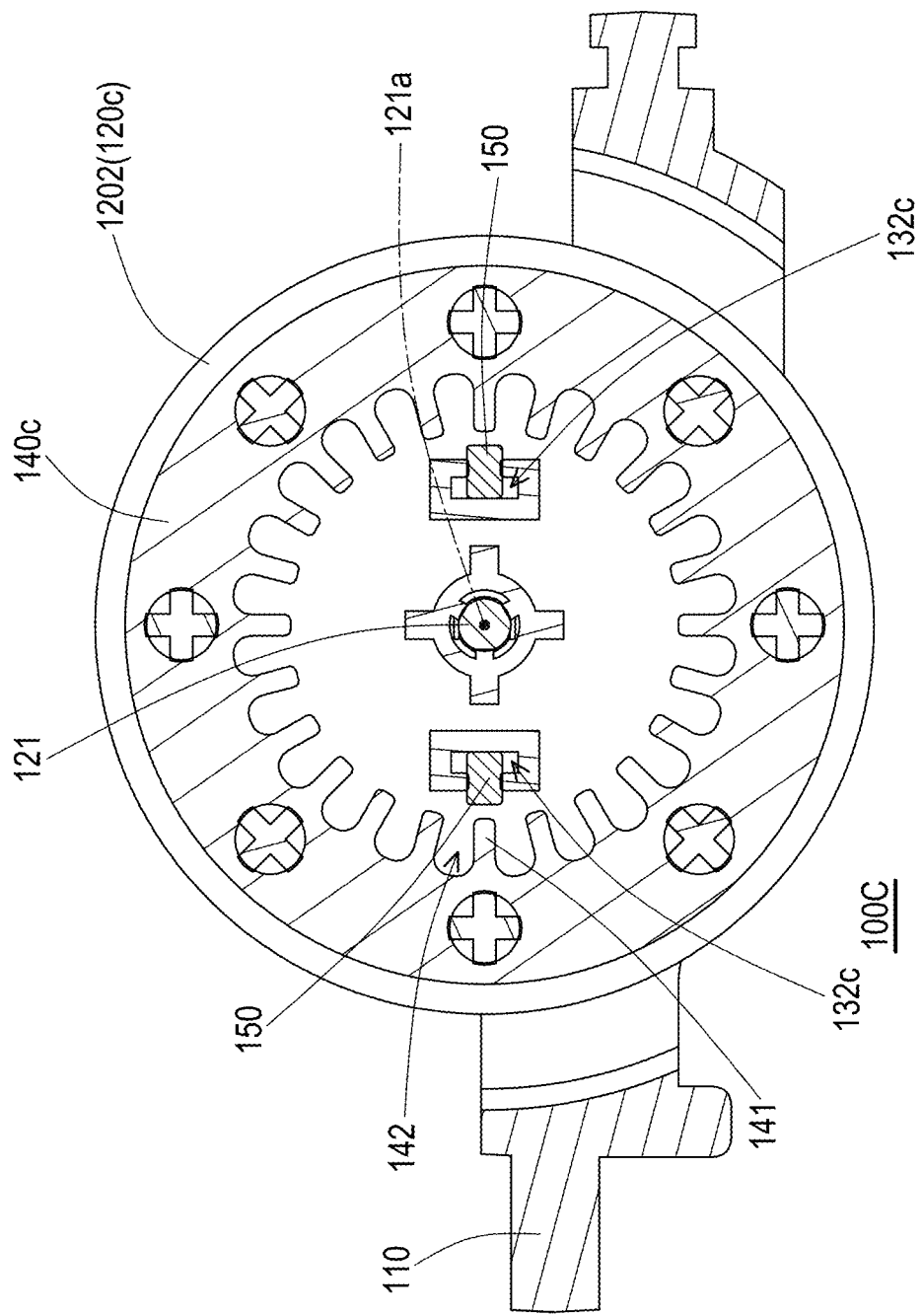
FIG. 4C is a schematic cross-sectional view of the scroll wheel structure of FIG. 4A along line A4-A4.

FIG. 4A is a schematic view of the scroll wheel structure of the fourth embodiment of the invention. FIG. 4B is an exploded schematic view of the scroll wheel structure of FIG. 4A. FIG. 4C is a schematic cross-sectional view of the scroll wheel structure of FIG. 4A along line A4-A4. Please refer to FIG. 4A to FIG. 4C. The main difference between the design principle of the scroll wheel structure 100C of the present embodiment and the first embodiment is the structural configuration of the scroll wheel frame.

In the present embodiment, the scroll wheel frame 120c includes a first scroll wheel plate 1201 and a second scroll wheel plate 1202 that are parallel to each other in the axial direction, and a magnetic member 140c is clamped and fixed between the first scroll wheel plate 1201 and the second scroll wheel plate 1202. The magnetic member 140c is generally similar to the second embodiment so the description is omitted. Moreover, each of the two magnets 150 are disposed in respective positioning groove 132c of the second body portion 132 of the positioning frame 130c corresponding to the magnetic member 140c.

Referring to FIG. 4A to FIG. 4C, the second body portion 132 of the positioning frame 130c passes through the first scroll wheel plate 1201 and the magnetic member 140c, such that the magnetic member 140c surrounds the positioning grooves 132c of the second body portion 132. When the finger of the user rolls the scroll wheel frame 120c, each of the magnets 150 remains stationary, while the magnetic member 140c is rotated synchronously with the scroll wheel frame 120c relative to the magnets 150, so that each of the magnets 150 is alternately aligned with the first portions 141 and the second portions 142 in the radial direction D of the scroll wheel frame 120c.

Figure 5A:
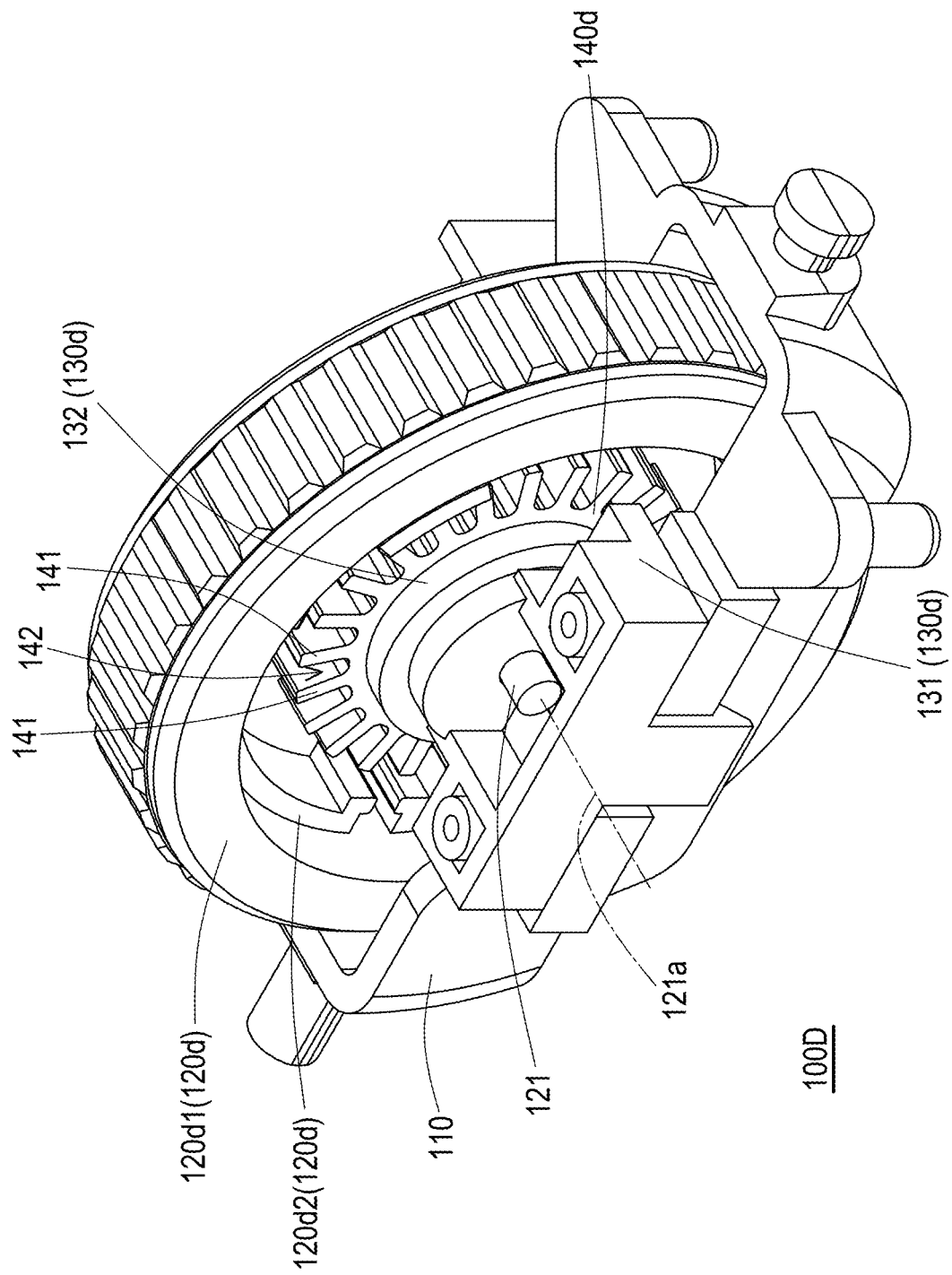
FIG. 5A is a schematic view of the scroll wheel structure of the fifth embodiment of the invention.
Figure 5B:
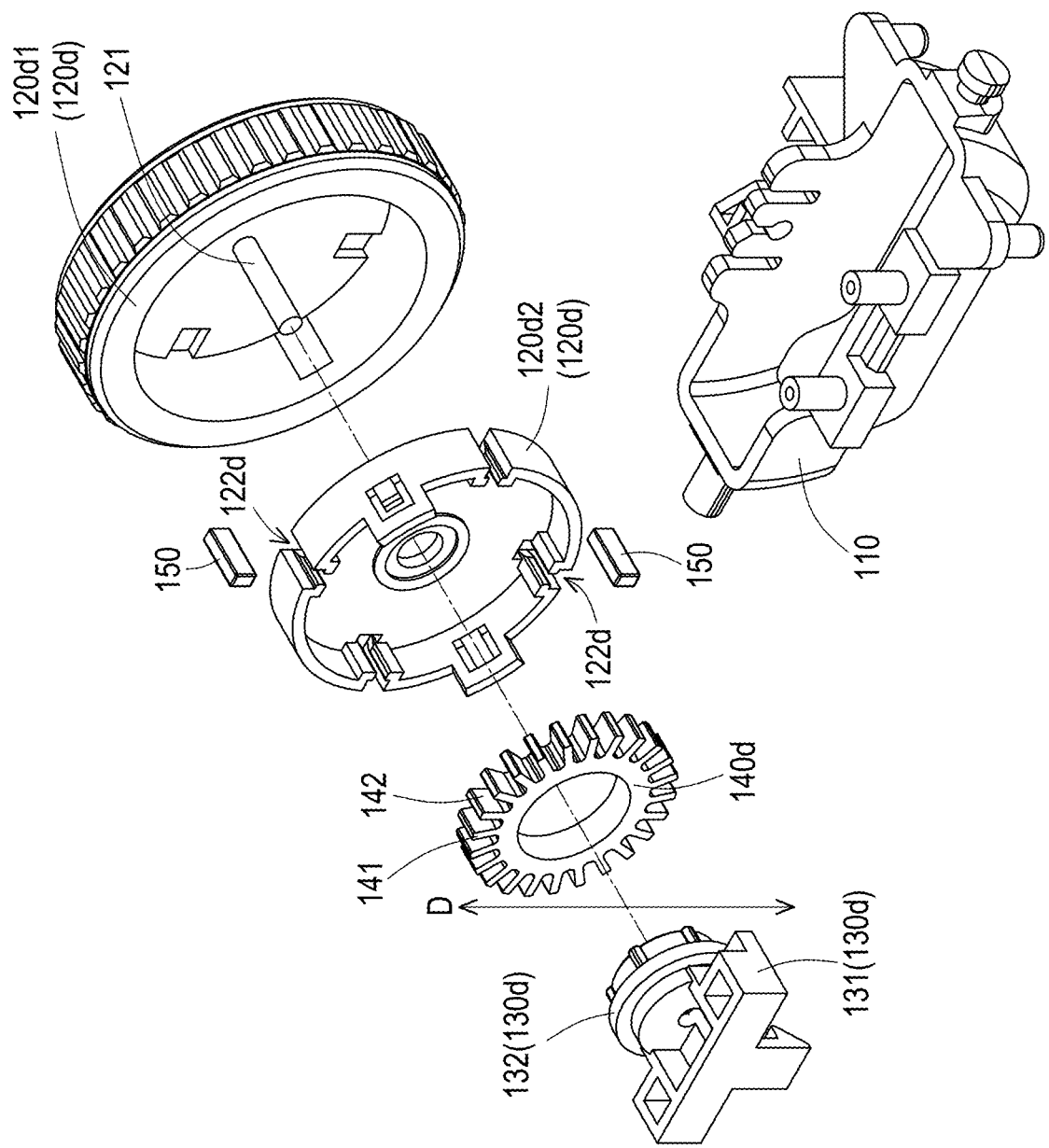
FIG. 5B is an exploded schematic view of the scroll wheel structure of FIG. 5A.

FIG. 5A is a schematic view of the scroll wheel structure of the fifth embodiment of the invention. FIG. 5B is an exploded schematic view of the scroll wheel structure of FIG. 5A. Please refer to FIG. 5A and FIG. 5B. The main difference between the scroll wheel structure 100D of the present embodiment and the first embodiment is the structural configuration of the scroll wheel frame. Furthermore, the scroll wheel frame 120d of the present embodiment includes an outer wheel frame 120d1 and an inner wheel frame 120d2. The inner wheel frame 120d2 is detachably fixed in the outer wheel frame 120d1, and two positioning grooves 122d are disposed in the radial direction D of its inner side. Each of the two magnets 150 is fixed in the respective positioning groove 122d. In addition, the magnetic member 140d is fixed to the second body portion 132 of a positioning frame 130d, wherein the pivot 121 on the outer wheel frame 120d1 passes through the inner wheel frame 120d2 and the second body portion 132 of the positioning frame 130d, and is pivotally connected to the first body portion 131. In the present embodiment, the first body portion 131 is a hook engaged with the support frame 110, so that the positioning frame 130c is detachably fixed to the support frame 110.

Figure 6A:
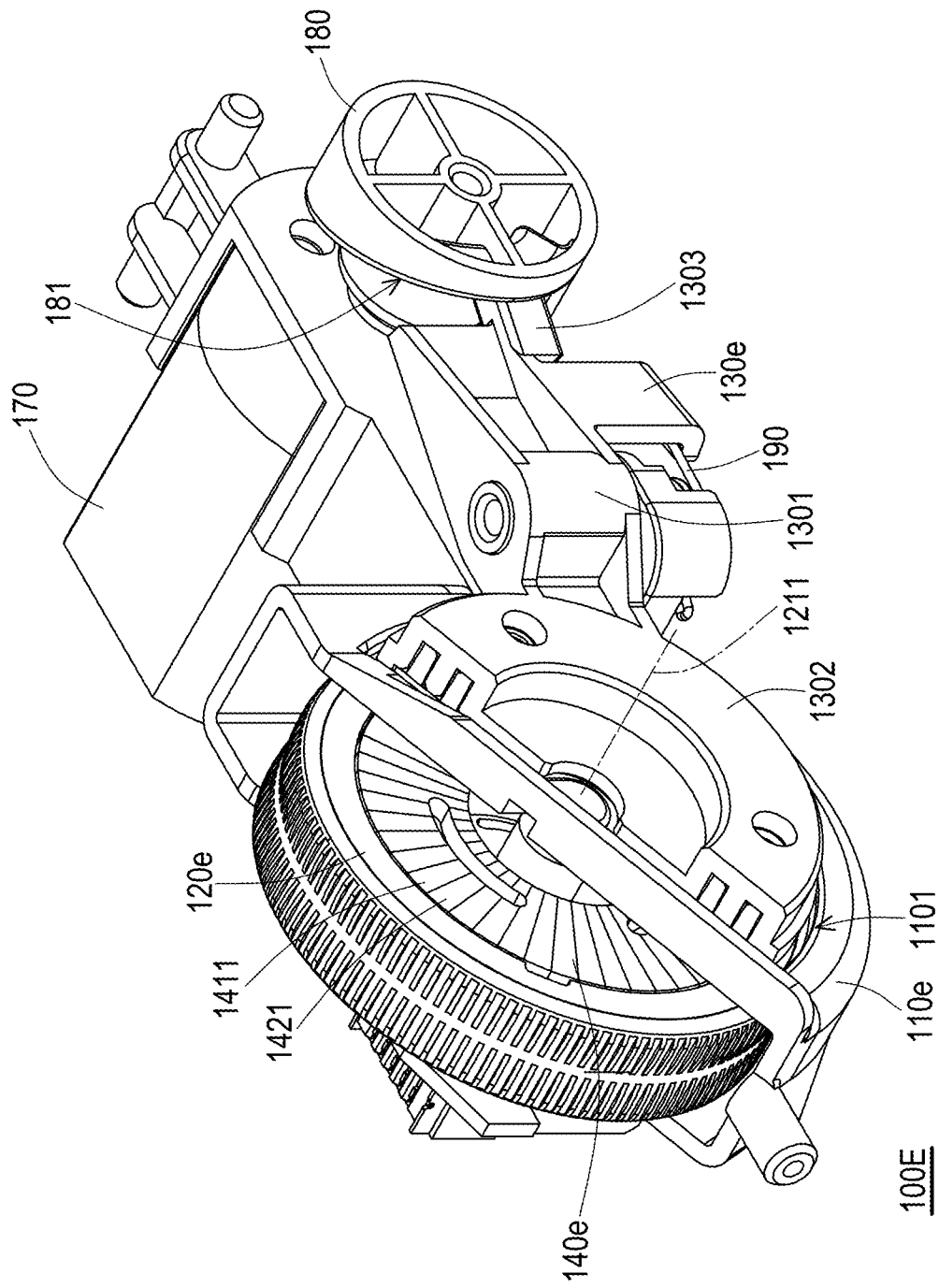
FIG. 6A is a schematic view of the scroll wheel structure of the sixth embodiment of the invention.
Figure 6B:
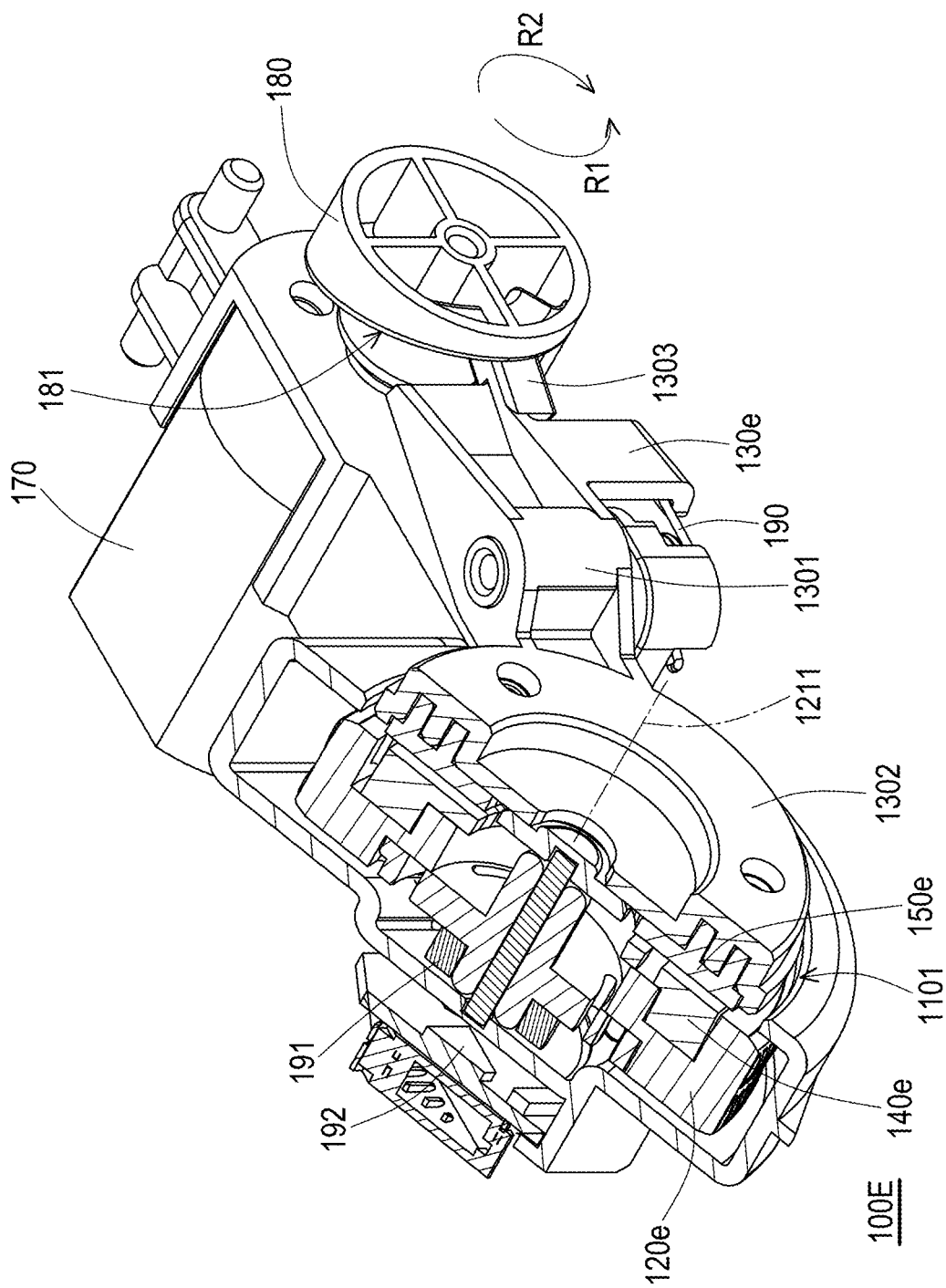
FIG. 6B is a partial schematic cross-sectional view of the scroll wheel structure in a first mode.
Figure 6C:
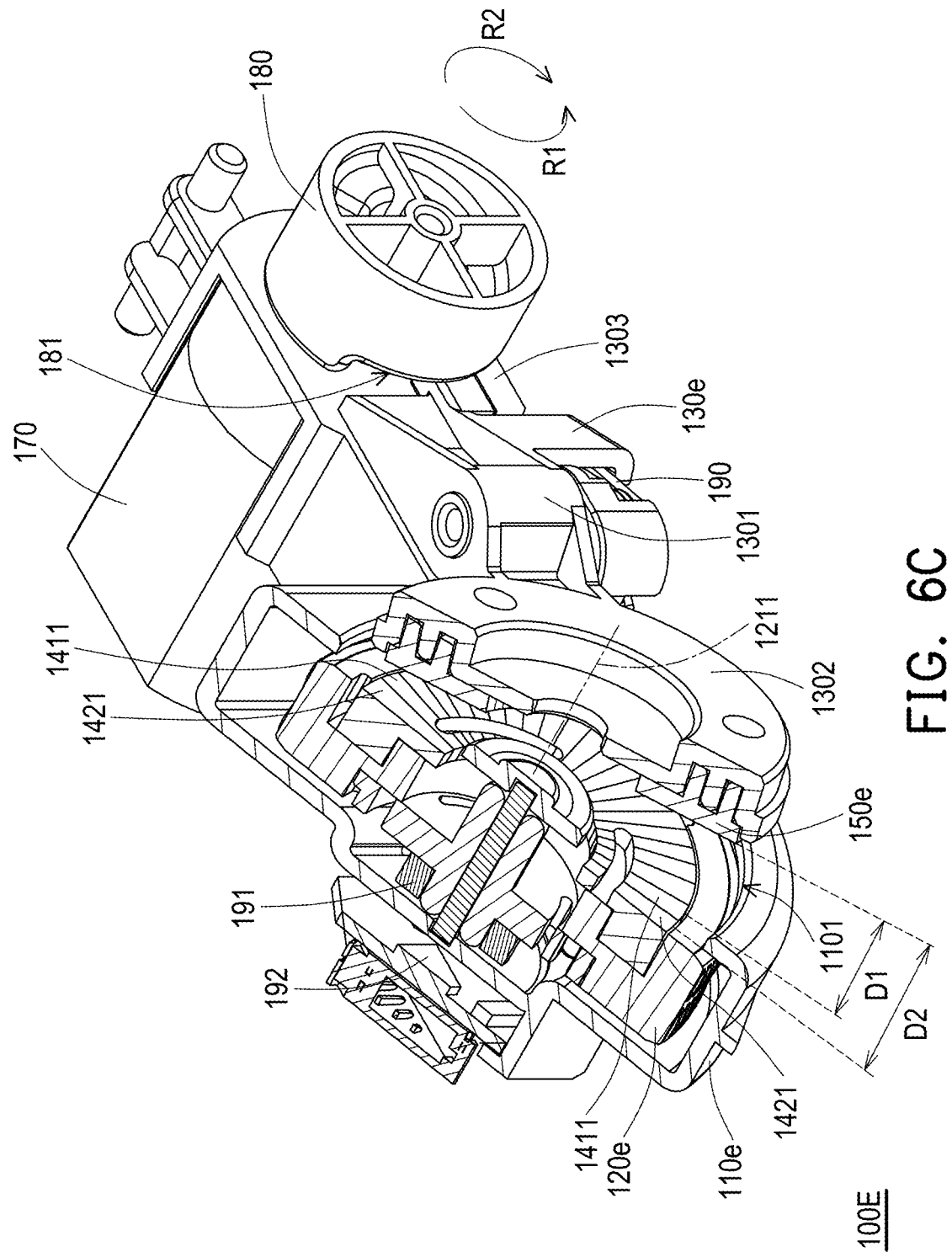
FIG. 6C is a partial schematic cross-sectional view of the scroll wheel structure switching to a second mode.

FIG. 6A is a schematic view of the scroll wheel structure of the sixth embodiment of the invention. FIG. 6B is a partial schematic cross-sectional view of the scroll wheel structure in a first mode. FIG. 6C is a partial schematic cross-sectional view of the scroll wheel structure switching to a second mode. Please refer to FIG. 6A to FIG. 6C. The main differences between the scroll wheel structure 100E of the present embodiment and the first embodiment are the configuration and the operation of the positioning frame.

In the present embodiment, the positioning frame 130e includes a first body portion 1301, a second body portion 1302, and a limiting portion 1303, wherein the first body portion 1301 is rotatably connected to one side of the support frame 110e, and the second body portion 1302 and the limiting portion 1303 are located at two opposite sides of the first body portion 1301. Moreover, the scroll wheel frame 120e is disposed in the support frame 110e and adapted to be rotated around an axis 1211 relative to the support frame 110e. The magnetic member 140e is disposed on the scroll wheel frame 120e. The scroll wheel frame 120e is disposed opposite to the second body portion 1302 in the axial direction (the direction along the axis 1211), wherein the support frame 110e has a lateral opening 1101 corresponding to the second body portion 1302, so that the magnetic member 140e disposed on the scroll wheel frame 120e is at least partially exposed from the lateral opening 1101.

Please refer to FIG. 6A to FIG. 6C. In the present embodiment, the magnet 150e is disposed between the magnetic member 140e and the second body portion 1302; it is fixed to a side in the second body portion 1302 facing the scroll wheel frame 120e. For example, the magnetic member 140e may be a magnetic washer surrounding the axis 1211, and the magnet 150e may be a semi-ring magnet surrounding the axis 1211. The magnet 150e is aligned with at least a portion of the magnetic member 140e via the lateral opening 1101 in the axial direction.

Moreover, the magnetic member 140e includes a plurality of first portions 1411 and a plurality of second portions 1421 alternately arranged around the axis 1211, wherein each of the first portions 1411 may be a first magnetic pole (such as one of an N pole and an S pole), and each of the second portions 1421 may be a second magnetic pole (e.g., the other of the N pole and the S pole, or a non-magnetic pole that is not magnetic). Correspondingly, the magnet 150e has a plurality of first magnetic poles 1511 (for example, one of an N pole and a S pole) and a plurality of second magnetic poles 1521 (for example, the other of the N pole and the S pole, or a non-magnetic pole) alternately arranged around the axis 1211.

Figure 6D:
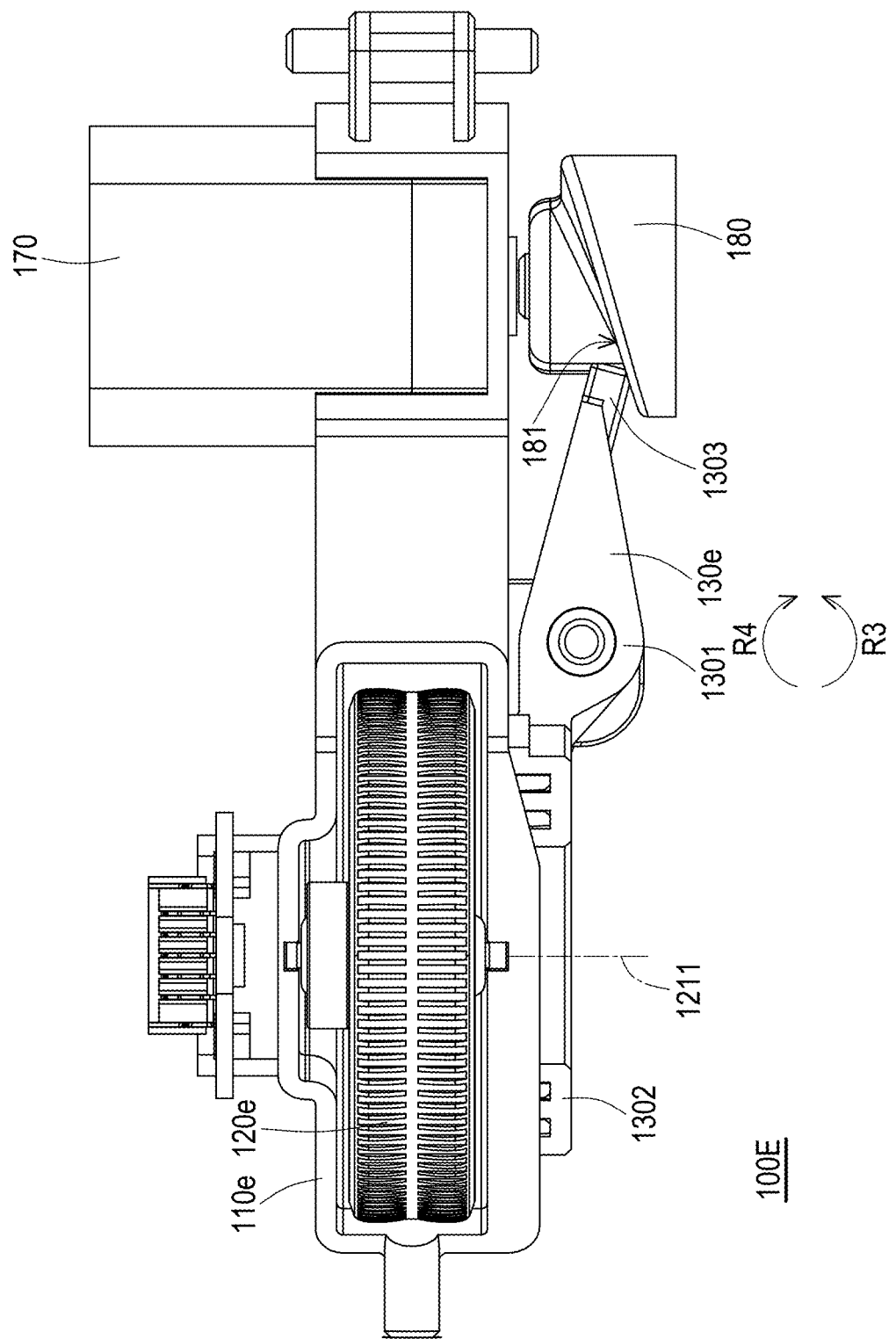
FIG. 6D is a schematic top view of the scroll wheel structure in the first mode.
Figure 6E:
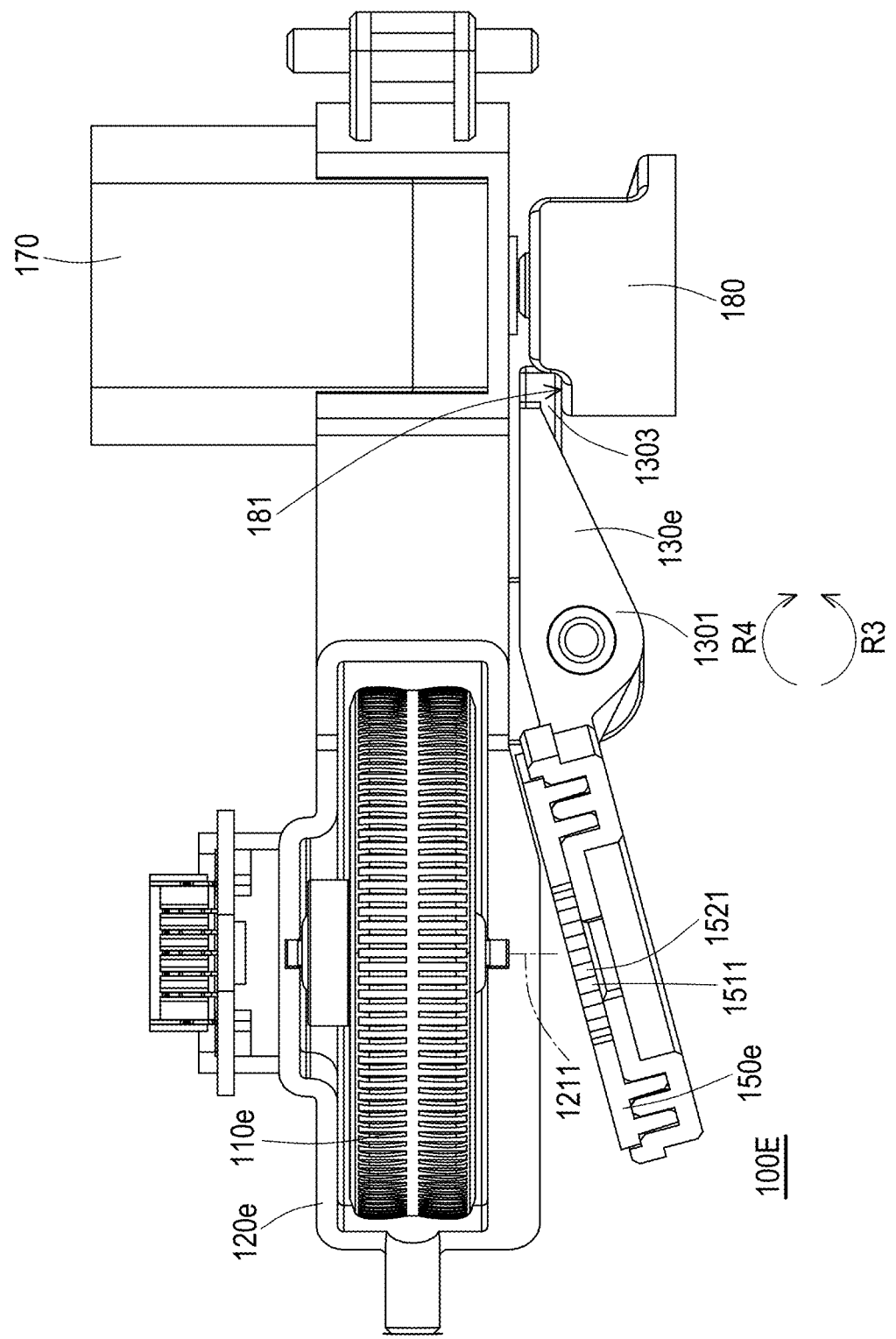
FIG. 6E is a schematic top view of the scroll wheel structure switching to the second mode.

FIG. 6D is a schematic top view of the scroll wheel structure in the first mode. FIG. 6E is a schematic top view of the scroll wheel structure switching to the second mode. Please refer to FIG. 6B to FIG. 6E, taking an input device integrated with the scroll wheel structure 100E as an example, the input device includes a motor 170, a limiting cam 180 coupled to the motor 170, a torsion spring 190, a sensing magnet 191, and a magnetic sensor 192.

Specifically, the motor 170 may drive the limiting cam 180 to be rotated along a first direction R1 or a second direction R2 opposite to the first direction R1, wherein the limiting cam 180 has an inclined surface 181 in sliding contact with the limiting portion 1303. The inclined surface 181 may be, for example, a spiral surface. The torsion spring 190 is disposed corresponding to the first body portion 1301, wherein one end of the torsion spring 190 is connected to the support frame 110e, and another end thereof is connected to the positioning frame 130e. The sensing magnet 191 is disposed at the scroll wheel frame 120e. The magnetic sensor 192 is configured to acquire information about the sensing magnet 191, for example, to detect the rotation speed of the sensing magnet 191 at the scroll wheel frame 120e. The magnetic sensor 192 is electrically coupled to the motor 170 and may be fixed on the support frame 110e corresponding to the sensing magnet 191.

As shown in FIG. 6B and FIG. 6D, in the first mode (or segmented mode), the second body portion 1302 of the positioning frame 130e is close to the scroll wheel frame 120e. When the finger of the user rolls the scroll wheel frame 120e, the magnet 150e remains stationary, while the magnetic member 140e is rotated synchronously with the scroll wheel frame 120e relative to the magnet 150e, so that the first magnetic poles 1511 and the second magnetic poles 1521 are alternately aligned with the first portions 1411 and the second portions 1421 in the axial direction to encounter alternating changes of magnetic repulsions and magnetic attractions, thereby providing the user clear segmented tactile feedback.

As shown in FIG. 6C and FIG. 6E, when the magnetic sensor 192 detects that the rotation speed of the sensing magnet 191 rotating synchronously with the scroll wheel frame 120e is greater than or equal to a predetermined value, the motor 170 is controlled to drive the limiting cam 180 to be rotated along the first direction R1 to push the limiting portion 1303 by the inclined surface 181 of the limiting cam 180. The entire positioning frame 130e is driven to rotate along a third direction R3, so that the second body portion 1302 is moved away from the scroll wheel frame 120e approximately in the axial direction. At this time, the torsion spring 190 is squeezed and has elastic potential energy stored therein. Here, since the second body portion 1302 is tilted relative to the scroll wheel frame 120e, there is the first distance D1 from the magnet 150e on the second body portion 1302 to the first portions 1411 of the magnetic member 140e on the scroll wheel frame 120e, and there is the second distance D2, different from the first distance D1, from the magnet 150e on the second body portion 1302 to the second portions 1421 of the magnetic member 140e on the scroll wheel frame 120e. This is the second mode, or shuttle mode.

In the second mode (shuttle mode), since the distance between the magnet 150e on the second body portion 1302 and the magnetic member 140e on the scroll wheel frame 120e is increased, the magnetic force acting between the magnet 150e and the magnetic member 140e is weakened, and the segmented tactile feedback generated by the interaction between the two is eliminated, thereby giving the user a rolling tactile feeling with no resistance or less resistance.

Accordingly, when the scroll wheel frame 120e is rotated at high speed and the magnetic sensor 192 detects that the rotation speed of the scroll wheel frame 120e reaches a predetermined value, the input device is switched from the first mode to the second mode, so that the scroll wheel frame 120e may be moved without resistance or with less resistance.

Correspondingly, it may be set that when the magnetic sensor 192 detects that the rotation speed of the sensing magnet 191 rotated synchronously with the scroll wheel frame 120e is less than a predetermined value, the motor 170 is controlled to drive the limiting cam 180 to be rotated along the second direction R2. The elastic force of the squeezed torsion spring 190 is released, and the entire positioning frame 130e is pushed to rotate along a fourth direction R4 opposite to the third direction R3. Thereby, the second body portion 1302 may be moved approximately in the axial direction to approach the scroll wheel frame 120e, so that the input device is returned to the first mode. In other words, by moving the positioning frame 130 to change the relative position or the distance between the magnet 150e and the magnetic member 140e, the device is capable of switching between the segmented mode generating greater feedback resistance and the shuttle mode generating less feedback resistance.

Figure 7A:
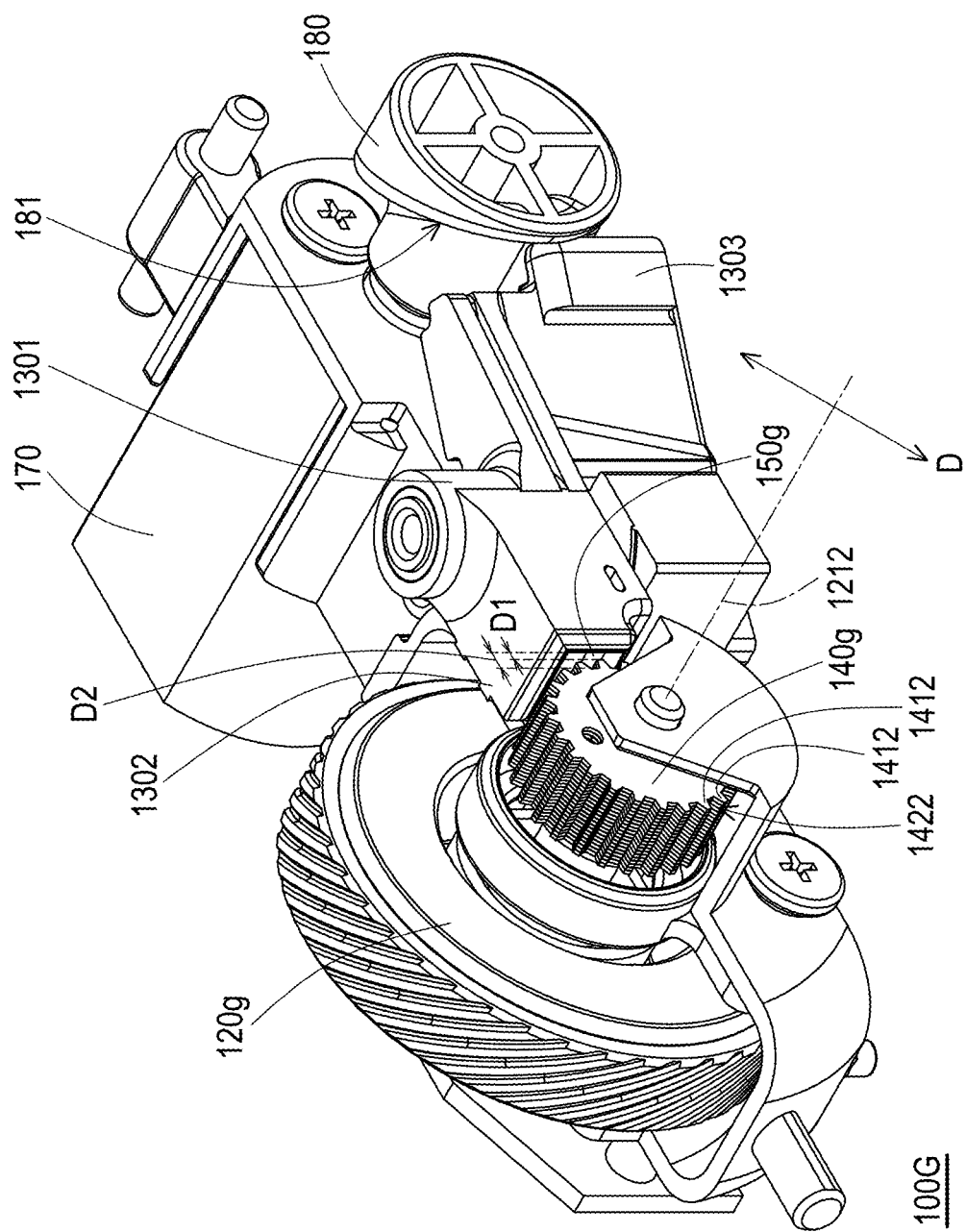
FIG. 7A is a schematic view of the scroll wheel structure of the seventh embodiment of the invention in the first mode.
Figure 7B:
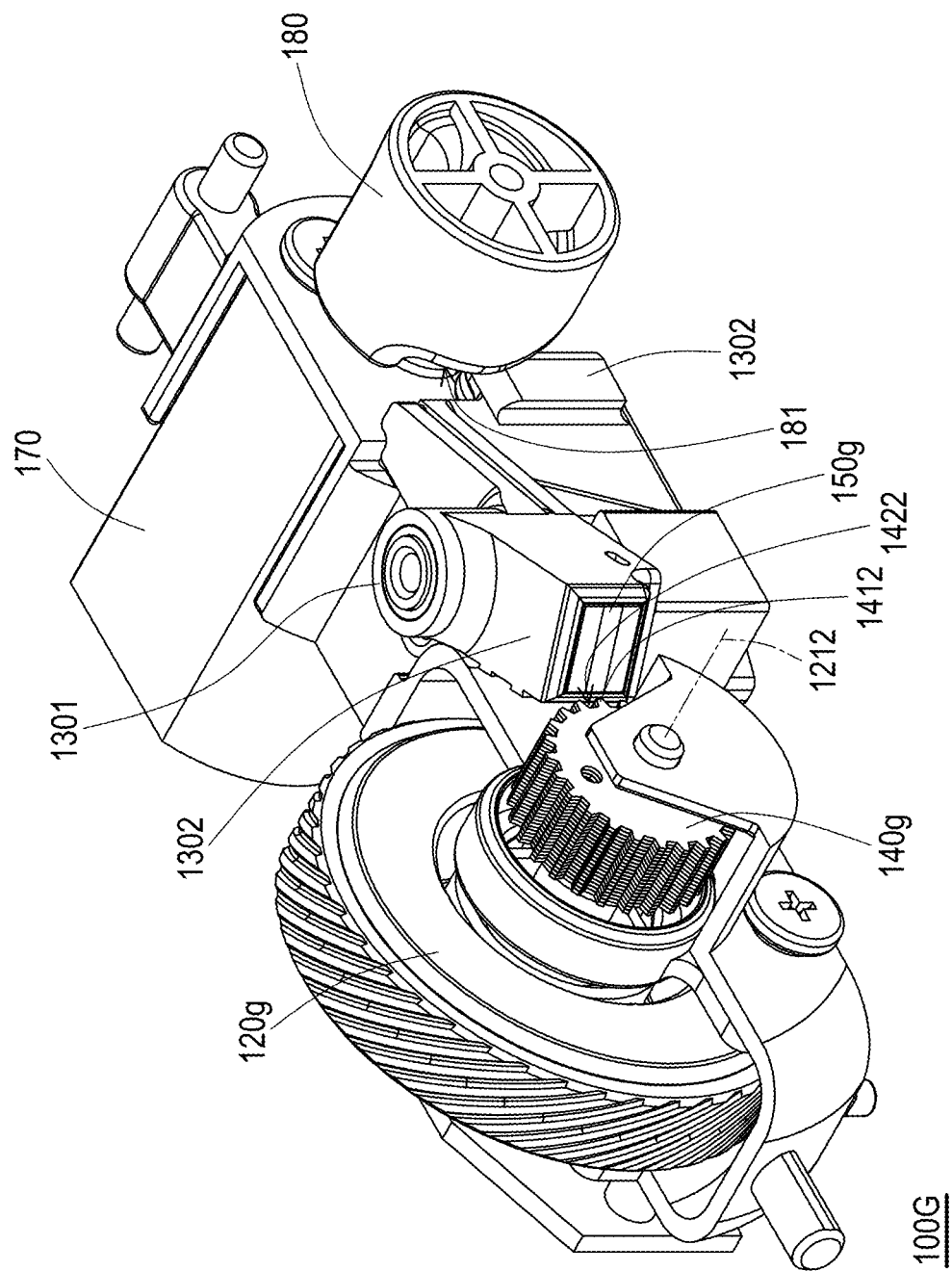
FIG. 7B is a schematic view of the scroll wheel structure of FIG. 7A transitioning to the second mode.

FIG. 7A is a schematic view of the scroll wheel structure of the seventh embodiment of the invention in the first mode. FIG. 7B is a schematic view of the scroll wheel structure of FIG. 7A transitioning to the second mode. Please refer to FIG. 7A and FIG. 7B. The main differences between the scroll wheel structure 100G of the present embodiment and the sixth embodiment are the arrangement and the structural configuration of the magnetic members and the magnets.

In the present embodiment, the magnetic member 140g may be a magnetic ring fixed on the scroll wheel frame 120g, and includes a plurality of first portions 1412 and a plurality of second portions 1422 alternately arranged around the axis 1212 on the outer peripheral surface of the magnetic ring (i.e., the magnetic member 140g). Each of the first portions 1412 may be a magnetic protrusion protruded along a direction (the radial direction D) perpendicular to the axis 1212, and each of the second portions 1422 may be a magnetic groove recessed along the radial direction D. Moreover, the magnet 150g is fixed on the second body portion 1302 corresponding to the magnetic member 140g in the radial direction D of the scroll wheel frame 120g.

In the first mode, the magnet 150g is at a position close to the magnetic member 140g. The magnet 150g has the first distance D1 with the aligning first portions 1412 and generates a first magnetic force, and has the second distance D2 greater than the first distance D1 with the aligning second portions 1422 and generates a second magnetic force less than the first magnetic force. Therefore, the magnetic force generated by rolling the scroll wheel frame 120g is alternately changed to provide clear segmented tactile feedback.

In the second mode, the second body portion 1302 is moved away from the magnetic member 140g, and the distance between the magnet 150g on the second body portion 1302 and the magnetic member 140g on the scroll wheel frame 120g is increased, thereby weakening the magnetic force acting on the scroll wheel frame 120g. Accordingly, the scroll wheel frame 120g may be rolled under feedback with no resistance or less resistance.

The quantity, the position, or the arrangement of each of the elements in the above embodiments may be adjusted according to design requirements.

Based on the above, the input device of the invention integrates a non-contact tactile feedback design into the scroll wheel structure to produce clear segmented tactile feedback by alternately changing the interacted magnetic forces when the finger of the user rolls the scroll wheel frame. In addition, based on this non-contact tactile feedback design, the deterioration of segmented tactile feedback caused by wear and tear of components may be prevented; thereby improving operating experience, extending the service life and reducing the failure rate of the input device. Moreover, by moving the positioning frame to change the relative positions or distance between the magnet and the magnetic member, switching between the segmented mode generating greater feedback resistance and the shuttle mode generating less feedback resistance may be performed.

Lastly, it should be noted that each of the above embodiments is used to describe the technical solutions of the invention rather than limiting them. Although the invention has been described in detail with reference to each embodiment above, those having ordinary skill in the art should understand that the technical solutions recited in the embodiments above may be modified, or some or all of the technical features thereof may be combined or equivalently replaced. These modifications, combinations, or replacements do not make the essence of the corresponding technical solutions depart from the scope of the technical solution of each embodiment of the invention.

What is claimed is:

1. An input device, comprising:
a housing having an opening; and
a scroll wheel structure disposed in the housing, wherein the scroll wheel structure comprises:
a support frame fixed in the housing;
a scroll wheel frame pivotally connected to the support frame via a pivot disposed at a center of the scroll wheel frame, so that the scroll wheel frame is adapted to be rotated around an axis of the pivot, and a portion of the scroll wheel frame is protruded out of the housing via the opening;
a positioning frame comprising a first body portion and a second body portion, wherein the first body portion is connected to the support frame, and the second body portion is disposed in the scroll wheel frame;
a magnetic member disposed in the scroll wheel frame, wherein the magnetic member comprises a first portion and a second portion, and the first portion and the second portion are alternately disposed around the axis; and
at least one magnet disposed at the positioning frame or the scroll wheel frame corresponding to the magnetic member, and the magnet is separated from the first portion by a first distance and separated from the second portion by a second distance.

2. The input device of claim 1, wherein the first body portion has an extension portion extended along a direction of the axis, and the extension portion is connected to the support frame.

3. The input device of claim 1, wherein at least one positioning groove is disposed in a radial direction of the second body portion, and the at least one magnet is fixed in the at least one positioning groove.

4. The input device of claim 1, wherein at least one positioning groove is disposed on an inner side of the scroll wheel frame in a radial direction, and the at least one magnet is fixed in the at least one positioning groove.

5. The input device of claim 1, wherein a quantity of both the first portion and the second portion are plurality, a plurality of positioning protrusions surrounding the axis are disposed at an inner side of the scroll wheel frame, and each of the positioning protrusions is engaged between two adjacent first portions or engaged in one of the second portions.

6. The input device of claim 1, wherein the magnetic member is disposed in an outer peripheral direction of the second body portion.

7. The input device of claim 6, wherein the magnetic member is a magnetic ring, the first portion and the second portion are arranged at one or both of an outer peripheral surface and an inner peripheral surface of the magnetic ring, the first portion is a protrusion protruded along a radial direction of the second body portion, and the second portion is a groove recessed along the radial direction of the second body portion.

8. The input device of claim 1, wherein the magnetic member is disposed in an axial direction of the positioning frame, the magnetic member is a magnetic ring or a magnetic plate, and the first portion and the second portion are respectively a protrusion protruded along a direction of the axis and a groove recessed along the direction of the axis.

9. The input device of claim 1, wherein the at least one magnet is aligned with at least one of the first portion and the second portion in a radial direction or an axial direction.

10. The input device of claim 1, wherein a weight member is disposed in an axial direction or a radial direction of the positioning frame.

11. The input device of claim 1, wherein the scroll wheel frame comprises a first scroll wheel plate and a second scroll wheel plate that are parallel to each other in a direction of the axis, the magnetic member is clamped and fixed between the first scroll wheel plate and the second scroll wheel plate, and the at least one magnet passes through the first scroll wheel plate and is extended into the magnetic member.

12. The input device of claim 1, wherein the magnetic member comprises a first fixing portion, the scroll wheel frame comprises a second fixing portion, and the first fixing portion is engaged with the second fixing portion.

13. An input device, comprising:
a housing having an opening; and
a scroll wheel structure disposed in the housing, wherein the scroll wheel structure comprises:
  a support frame fixed in the housing;
  a scroll wheel frame pivotally connected to the support frame via a pivot disposed at a center of the scroll wheel frame, so that the scroll wheel frame is adapted to be rotated around an axis of the pivot, and a portion of the scroll wheel frame is protruded out of the housing via the opening;
  a positioning frame comprising a first body portion and a second body portion, wherein the first body portion is connected to the support frame, and the second body portion is opposite to the scroll wheel frame;
  a magnetic member disposed at the scroll wheel frame, wherein the magnetic member comprises a first portion and a second portion, and the first portion and the second portion are alternately disposed around the axis; and
  at least one magnet disposed at the positioning frame corresponding to the magnetic member, the at least one magnet is separated from the first portion by a first distance and separated from the second portion by a second distance.

14. The input device of claim 13, wherein the magnetic member is a magnetic washer, the first portion is a first magnetic pole, and the second portion is a second magnetic pole different from the first magnetic pole or a non-magnetic pole.

15. The input device of claim 14, wherein the at least one magnet has a first magnetic pole and a second magnetic pole different from the first magnetic pole or a non-magnetic pole, and the first magnetic pole and the second magnetic pole or the non-magnetic pole are alternately disposed around the axis.

16. The input device of claim 13, wherein the magnetic member is a magnetic ring, and the first portion is a plurality of magnetic protrusions arranged along an outer peripheral surface of the magnetic ring.

17. The input device of claim 13, wherein the first body portion is rotatably connected to a side of the support frame, the at least one magnet is disposed at the second body portion, and the second body portion may be moved in an axial direction relative to the scroll wheel frame.

18. The input device of claim 17, further comprising a motor and a limiting cam coupled to the motor, wherein the positioning frame further comprises a limiting portion, the second body portion and the limiting portion are located at two opposite sides of the first body portion, the at least one magnet is disposed at a side in the second body portion facing the magnetic member, the limiting cam has an inclined surface, and the limiting portion is in sliding contact with the inclined surface.

19. The input device of claim 18, further comprising:
a sensing magnet disposed at the scroll wheel frame; and
a magnetic sensor disposed on the support frame, configured to detect information about the sensing magnet, and electrically coupled to the motor.

* * * * *